United States Patent [19]

Braunlich et al.

[11] Patent Number: 4,906,848
[45] Date of Patent: * Mar. 6, 1990

[54] APPARATUSES AND METHODS FOR LASER READING OF PHOSPHORS

[75] Inventors: Peter F. Braunlich; Wolfgang Tetzlaff, both of Pullman, Wash.

[73] Assignee: International Sensor Technology, Inc., Pullman, Wash.

[*] Notice: The portion of the term of this patent subsequent to Jan. 20, 2004 has been disclaimed.

[21] Appl. No.: 365,180

[22] Filed: Jun. 12, 1989

Related U.S. Application Data

[63] Continuation of Ser. No. 882,953, Jul. 7, 1986, Pat. No. 4,839,518, which is a continuation-in-part of Ser. No. 652,829, Sep. 20, 1984, Pat. No. 4,638,163.

[51] Int. Cl.$^4$ ............................................. G01T 1/115
[52] U.S. Cl. .................................. 250/337; 250/354.1
[58] Field of Search .................... 250/337, 484.1, 354.1

[56] References Cited

U.S. PATENT DOCUMENTS

| | | | |
|---|---|---|---|
| 3,531,641 | 9/1970 | Weissenberg . | |
| 3,603,791 | 9/1971 | Cherault | 250/337 |
| 3,729,630 | 4/1973 | Yamashita et al. | 250/337 |
| 3,790,784 | 2/1974 | Webb et al. | 250/337 |
| 4,204,119 | 5/1980 | Yasuno et al. | 250/337 |
| 4,507,562 | 3/1985 | Gasiot et al. | 250/484.1 |
| 4,638,163 | 1/1987 | Braunlich et al. | 250/354.1 |
| 4,839,518 | 6/1989 | Braunlich et al. | 250/337 |

FOREIGN PATENT DOCUMENTS

| | | | |
|---|---|---|---|
| 128176 | 10/1980 | Japan | 250/337 |
| 56-19416 | 2/1981 | Japan . | |
| 101577 | 8/1981 | Japan . | |

OTHER PUBLICATIONS

Nemeth et al., "A Programmable Temperature Controller for Thermoluminescence and Thermally Stimulated Conductivity Studies", Exp. Tech. Phys. (Germany), 21(5), 1973, pp. 443–447.

Abstract, "Heating of Continuous Thermoluminescent Layers with Localized Laser Beams", by P. Braunlich et al., *Journal of Radiation Protection Dosimetry*, vol. 6, issues 1–4 (as a unit), Apr. 1984.

Gasiot et al., "Laser Heating in Thermoluminescence Dosimetry", *J. Appl. Phys.*, 53(7), Jul. 1986, pp. 5200–5209.

*Applied Thermoluminescence Dosimetry*, M. Oberhofer and A. Scharmann, Editors, Chapter 3, entitled "Instrumentation", 1981.

J. Gasiot et al., "Laser Heating in Thermoluminescence Dosimetry", *J. Appl. Phys.*, 53(7), Jul. 1982, pp. 5200–5209.

*Primary Examiner*—Carolyn E. Fields
*Attorney, Agent, or Firm*—Wells, St. John & Roberts

[57] ABSTRACT

Apparatuses and methods for rapidly reading phosphors to determine the amount of energy stored therein. The stored energy is interpreted as a measure of the total exposure of the phosphor to ionizing radiation. The phosphor reading apparatus uses a laser to generate a laser beam. The laser beam power level is monitored by a laser power detector and controlled to maintain the power level at a desired value or values which can vary with time. A shutter or other laser beam interruption means is used to control exposure of the phosphor to the laser beam. The laser beam can be equalized using an optical equalizer so that the laser beam has an approximately uniform power density across the beam. The phosphor emits a visible or otherwise detectable emission which is measured as an indication of the radiation exposure of the phosphors. Also disclosed are preferred signal processing and control circuits including one system using a digital computer. Also disclosed are time-profiled laser power cycles for pre-anneal, read and post-anneal treatment of phosphors.

105 Claims, 10 Drawing Sheets

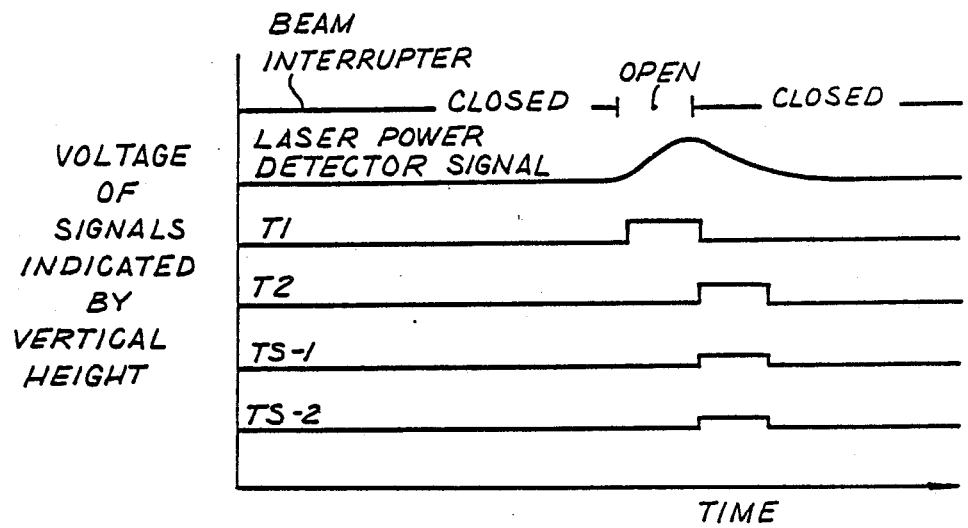
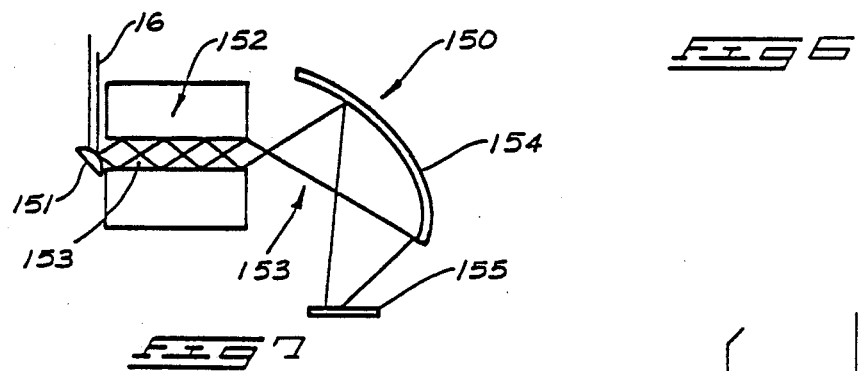
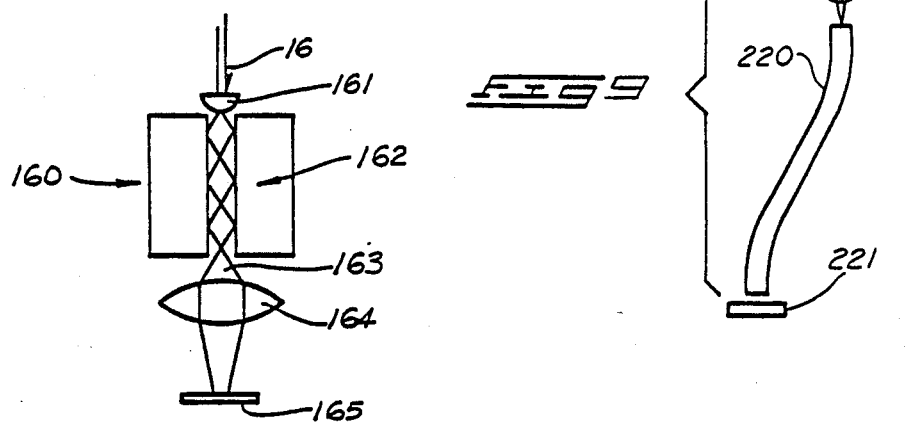
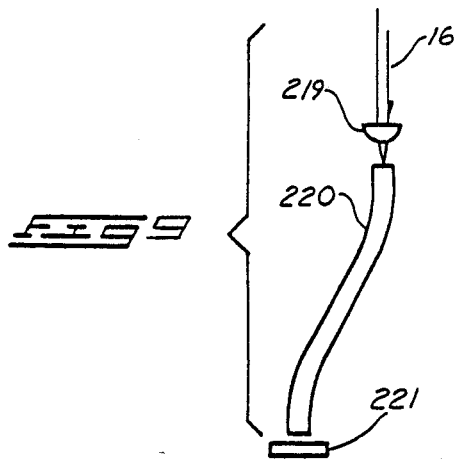

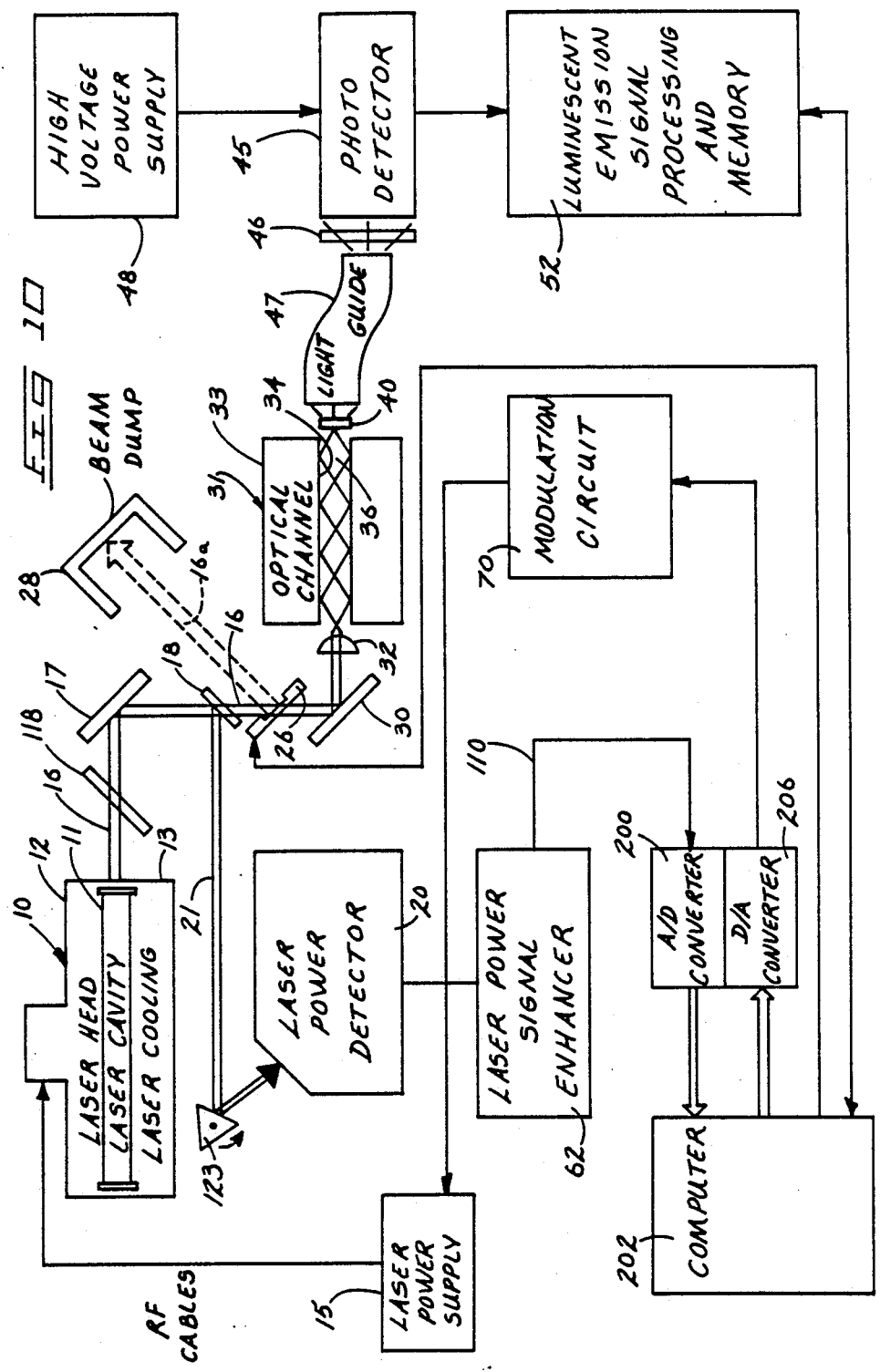

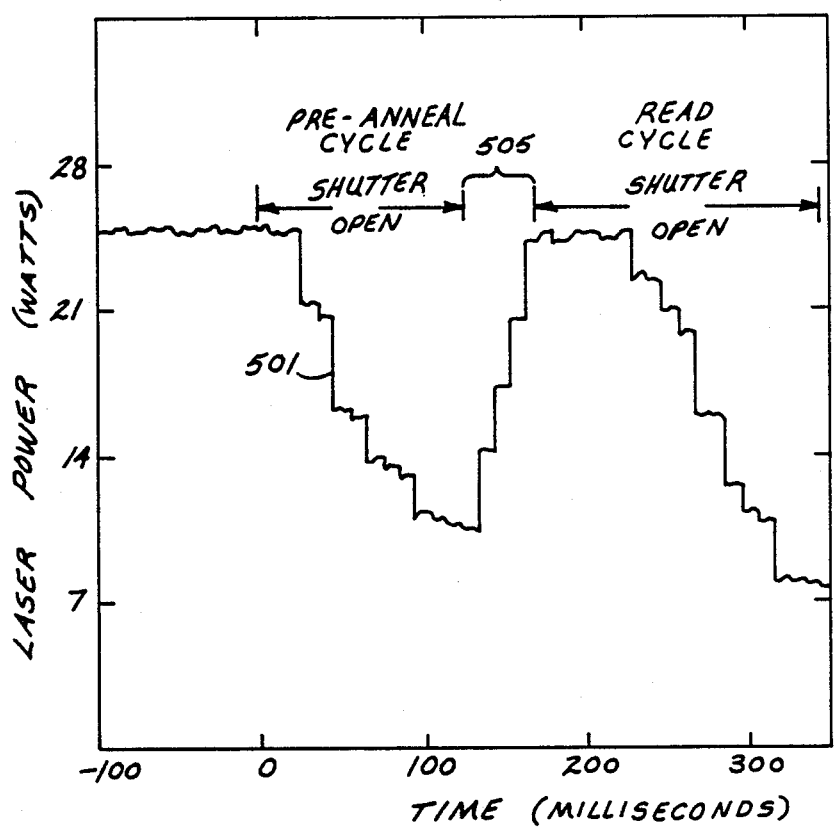

APPARATUSES AND METHODS FOR LASER READING OF PHOSPHORS

CROSS-REFERENCE TO RELATED APPLICATIONS

This is a continuation of co-pending U.S. patent application Ser. No. 882,953, filed July 7, 1986; which was a continuation -in-part of U.S. patent application Ser. No. 652,829, filed Sept. 20, 1984, now U.S. Pat. No. 4,638,163, issued Jan. 20, 1987.

TECHNICAL FIELD

The technical field of this invention includes apparatus and methods for reading thermoluminescent phosphors to determine the level of excitation which has occurred from exposure of the phosphors to ionizing radiation.

BACKGROUND OF THE INVENTION

It is well known in the art that certain materials called thermoluminescent phosphors can be irradiated with high energy radiation, and then subsequently stimulated using heat, to produce a luminescent emission. Thermoluminescent phosphors are in widespread use in radiation dosimeters used to measure the amount of incident radiation to which people, animals, plants and other things are exposed. Thermoluminescent dosimeters are widely used by workers in the nuclear industries to provide a constant monitor for measuring exposure to radiation.

Thermoluminescent phosphors are excited by energetic radiation such as ultraviolet, X-ray, gamma, and other forms of radiation. Such ionizing radiation causes electrons within the thermoluminescent material to become highly energized. The nature of thermoluminescent materials cause these high energy electrons to be trapped at relatively stable higher energy levels. The electrons stay at these higher energy levels until additional energy, usually in the form of heat, is supplied which releases the trapped electrons thereby allowing them to fall back to a lower energy state. The return of the electrons to a lower energy state causes a release of energy primarily in the form of visible light which is ordinarily termed a luminescent emission.

The use of thermoluminescent phosphors in personal dosimeters has led to demand for a large number of dosimeters which must be read on a routine basis in order to monitor the possible exposure of persons or other objects to ionizing radiation. Because of the substantial numbers, the job of reading dosimeters becomes time-consuming and costly.

There are four commonly known methods of heating thermoluminescent material in order to release the trapped electrons and provide the luminescent emission which is measured as an indication of the amount of ionizing radiation to which the dosimeter was exposed. The first and most common method for heating thermoluminescent phosphors is by contact heating. The second method is heating using a hot gas stream which is impinged upon the phosphor. The third method uses radiant energy in the form of infrared beams which heat the luminescent phosphor. The fourth method uses infrared laser beams to provide the necessary heat for luminescent emission.

Contact heating is the most widespread, but is also the most time-consuming and unreliable. Conventional contact heating occurs using a hot finger or contacting probe which produces a highly non-uniform temperature distribution in the phosphor being heated. This is particularly true when thin layer or film type dosimeter configurations are used. Contact heating has also been found unacceptable for reading dosimeters used to measure relatively low energy beta ray doses.

Heating phosphors using a hot gas stream has proven to be faster and more uniform than contact heating, Unfortunately, this method of heating requires rather large scale heat exchanger equipment and is fairly costly to implement.

Heating with infrared beams has provided improved results over contact and hot gas heating. One example of such a thermoluminescent phosphor reading apparatus is shown in U.S. Pat. No. 4,204,119 to Yasuno et al. The Yasuno patent shows an apparatus using an infrared emitting incandescent lamp which rapidly heats the back surface of a substrate. A small amount of thermoluminescent powder is attached to the substrate on the opposite side from the surface exposed to the infrared beam. Yasuno thus shows a configuration where the substrate is heated directly, and through conduction the heat is transferred to the thermoluminescent powder.

U.S. Pat. No. 3,531,641 to Weissenberg teaches the manufacture of thermoluminescent dosimeters containing thermoluminescent phosphors held in a synthetic material. The synthetic material must be capable of surviving the heat and heating rays since it is used as a conductor of heat to the thermoluminescent phosphor which is contained therein.

The dosimeters and heating method described by Yasuno et al and Weissenberg have provided useful technology, but unfortunately are limited and have been found not entirely satisfactory for thermoluminescent dosimetry used in medical research, radiation therapy, and personal and environmental monitoring. Such applications preferably use or require very small dosimeters using in many cases less than one milligram of thermoluminescent phosphor in the form of a small discrete dot or very thin layer. In the case of thin layer dosimeters, it is desirable to have less than ten milligrams of thermoluminescent phosphor per square centimeter of dosimeter area. Using such small amounts of thermoluminescent material requires that the material be heated in a very rapid manner in order to provide sufficient luminescent energy emission so that detectable levels of emission can be measured without being obscured by the electronic noise in the measuring equipment. Rapid heating of such small amounts of luminescent phosphor to about 400° C. is slowed when a substrate material must be initially heated in order to conduct heat to the thermoluminescent phosphor.

Heating of thermoluminescent phosphors by heat conduction through a substrate also limits the rate at which the material can be heated for another reason. If too much heat is applied very rapidly, the substrate material itself tends to incandesce thereby creating luminous emissions which are sensed by the luminescent emission detection equipment and translated into an erroneous reading of the dosimeter. Accordingly, the time required for reading thermoluminescent phosphors using conduction techniques has been severely limited and the best known times are approximately one half second.

U.S. Pat. No. 3,729,630 to Yamashita et al discloses a thermoluminescent readout instrument utilizing an infrared laser source which is used to heat a thermoluminescent dosimeter element. Instruments constructed according to Yamashita et al have been found lacking in that the luminescent emission glow curve resulting from laser stimulation does not provide the characteristic glow peak which is desirable for easy, accurate determination of the radiation levels to which the dosimeter was exposed.

The current invention has identified that nonuniformity in the laser beam power density and instabilities over time in the power output of the laser contribute to a lack of speed and accuracy in reading thermoluminescent phosphors. The nonuniformity in laser beam power appears to be a property of known lasers such as the carbon dioxide lasers. Such lasers exhibit a Gaussian or bell-shaped curve when power or intensity is graphed as a function of beam cross-sectional position. This nonuniform beam power profile causes localized intense heating at the center of the beam. Temperatures of the phosphor accordingly vary across the phosphor producing delayed luminescent release.

Instabilities in the power output of a laser with time have also been identified in the invention as a contributing factors in making luminescent glow curves less capable of accurate interpretation. It has been previously known that laser power can be made more constant over time using temperature stabilizing devices, or closed loop controlled piezoelectric pushers which move the laser mirrors relative to one another in quick response to the thermally induced motions of the laser components. The temperature stabilization techniques for stabilizing laser power output are not totally effective, in part because of the very slow response times. The piezoelectric pushers are very expensive and accordingly have not been widely used.

The present invention has also been identified that the laser power level used to heat thermoluminescent phosphors can be profiled or adjusted as a function of time to minimize the incandescence which otherwise occurs when laser heating is performed over relatively short periods of time with associated high rates of heat input. Furthermore, laser powered pre-annealing cycles and post-annealing cycles can be employed before and after the main thermoluminescent read cycle to further enhance accuracy and eliminate manual handling to pre-anneal and post-anneal the thermoluminescent phosphor.

It is an object of this invention to provide thermoluminescent phosphor reading apparatus which can very rapidly stimulate thermoluminescent phosphors in a manner that allows accurate and reliable measurement of the resulting luminescent emissions.

It is an alternative object of this invention to provide a thermoluminescent phosphor reading apparatus which can provide time-varying laser stimulation of a thermoluminescent phosphor.

It is another object of this invention to provide methods by which thermoluminescent phosphors can be very rapidly stimulated using a laser source to produce accurate and repeatable luminescent emissions which are indicative of the amount of ionizing radiation to which the original thermoluminescent material was exposed.

It is an alternative object of the invention to provide methods of reading thermoluminescent phosphors having controlled time varying laser power output which can be used to minimize incandescence and provide other benefits.

It is a further alternative object of the invention to provide methods and apparatus for controlled laser powered pre-annealing and post-annealing cycles for further increasing phosphor reading accuracy and minimizing handling time.

These and other objects and advantages of some or all of the embodiments of this invention will be apparent from the description given herein.

BRIEF DESCRIPTION OF THE DRAWINGS

Preferred embodiments according to the invention are illustrated in the accompanying drawings, in which:

FIG. 6 is a timing diagram for the first embodiment showing the relationship between the detector signal and control timing signals;

FIG. 7 is an alternative beam equalizing means;

FIG. 8 is a further alternative beam equalizing means;

FIG. 9 is a still further alternative beam equalizing means;

FIG. 10 is a diagrammatic representation of a second embodiment of thermoluminescent phosphor reading apparatus according to this invention;

FIG. 14 is a graph showing a laser power profile for pre-anneal and read cycles using the time-profiled laser heating methods of this invention.

DETAILED DESCRIPTION OF THE PREFERRED EMBODIMENTS

In compliance with the constitutional purpose of the Patent Laws "to promote the progress of science and useful arts" (Article 1, Section 8), applicant submits the following disclosure of the invention.

Figure 1:
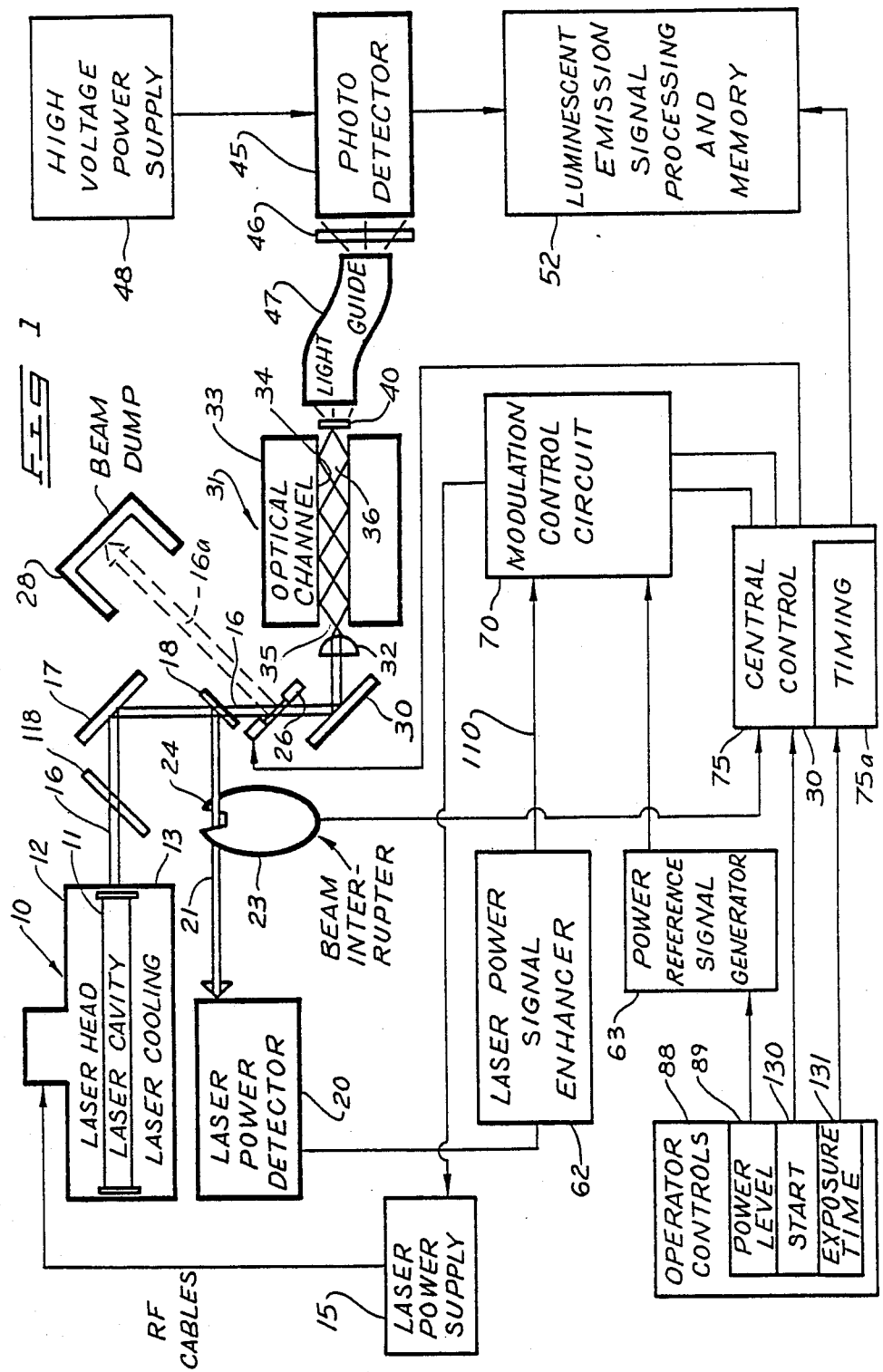
FIG. 1 is a diagrammatic representation of a first embodiment thermoluminescent phosphor reading apparatus according to this invention.

A first form of laser powered thermoluminescent phosphor reading apparatus according to this invention is shown in FIG. 1. Such apparatus includes a laser beam source means 10 for providing laser radiant energy for heating the thermoluminescent phosphors being read. Laser beam source means 10 includes a laser head 12 having a laser cavity 11, and preferably a laser cooling and temperature stabilization unit 13 attached thereto for helping to stabilize the temperature and intensity level of laser cavity 11. Laser beam source means 10 preferably emits a laser beam 16 which is preferably in the infrared spectrum so that the visible light luminescent emissions can be distinguished therefrom. Laser head 12 is powered by a laser power supply 15.

Examples of acceptable instruments for constructing the laser beam source means 10 include a radio frequency carbon dioxide laser available from Laakmann Electro-Optics, Model RF125. The laser cooling and temperature stabilization unit 13 can advantageously be a Laakman Electro-Optics Model RF165 cooling unit and Model TC16000 temperature controller. Laser power supply 15 can advantageously be a radio frequency power supply such as Laakman Model RF250. Such a radio frequency power supply can advantageously be operated at 44 megahertz or other suitable frequencies depending on the system employed. Such a combination of components produces a laser beam 16 having a nominal power of 15 watts and a nominal beam diameter of 1.8 millimeters.

An alternative laser configuration could include a carbon dioxide wave guide laser with a direct current high voltage excitation such as Model 82-40000 from California Laser. Such a laser has the nominal power output of 45 watts. Using such a model eliminates the need for the radio frequency power supply since the Model 82-400000 has a high voltage direct current power supply and also uses water cooling for temperature stabilization.

Laser power supply 15 must be capable of being modulated to regulate the output power of the power supply and hence the output power of the laser beam 16 which is emitted from laser cavity 11. In the case of a radio frequency power supply, the laser power supply 15 can be modulated by varying the amplitude of the radio frequency voltage. In the case of a direct current high voltage power supply the discharge current of the high voltage DC power supply is modulated to regulate the laser beam power. Modulation of the laser power supply 15 may be possible using other alternative variations.

Laser beam 16 is emitted from laser beam source means 10 and is advantageously, but not necessarily, directed against a reflective means such as infrared mirror 17. Reflected laser beam 16 then encounters a laser beam splitting means 18 which allows most of the beam to be transmitted directly therethrough and the remaining beam to be reflected toward a laser power detector 20. Laser beam splitting means 18 can advantageously be a thin sheet of material which is transparent to the 10.6 micrometer wavelength radiation produced by a typical $CO_2$ laser. Examples of suitable materials include germanium, barium fluoride, or zinc selenide. Thin flat pieces constructed of these and other suitable materials form windows which are usually antireflectively coated to provide high transmissibility. Orientation of the beam splitting means at a particular angle allows only a small percentage of the beam to be reflected, thereby forming detector beam 21.

Laser beam 16 is preferably polarized either within laser cavity 11 or at some point between laser beam source means 10 and infrared mirror 17. Polarization of beam 16 is achieved using a polarization means which preferably provides time independent or fixed polarization. Fixed polarization is needed because the reflective elements such as mirror 17 and beam splitter 18 have varying reflectiveness depending upon the polarization orientation of the beam. Changes of polarization experienced in some lasers cause changes in the intensity of the reflected detector beam 21. This leads to erroneous power adjustments solely due to polarization changes.

An appropriate polarization means 118 can comprise a thin film of polarizing material well known in the art applied upon an optically flat substrate which can advantageously be zinc selenide. The composite is oriented with the incidence beam at the Brewster angle of approximately 67 degrees from a line perpendicular to the surface of the polarizer. Other alternative polarization means will be apparent to those skilled in the art.

As an alternative to the lasers and polarizer above, it may also be possible to use a laser having a polarizer integrated or included in the laser cavity. An example of such a laser is Model No. LS35-P from Directed Energy, Inc., Irvine, CA which can be equipped with an intracavitary polarizer.

Detector beam 21 from beam splitting means 18 is directed to a laser power detector 20. A beam interruption means such as chopping wheel 23 can be used to limit the time during which detector beam 21 strikes laser power detector 20. Chopping wheel 23 is provided because a preferred form of laser power detector is not capable of continuously reading the power of detector beam 21.

Alternatively, a scanning mirror may be used as the beam interruption means. As seen in FIG. 10, scanning mirror 123 rotates about its axis to reflect detector beam 21 across laser power detector 20. The laser power detector 20 is thus exposed to detector beam 21 intermittently, in a manner functionally equivalent to the chopping wheel 23 of FIG. 1.

Although not shown in FIG. 1, detector beam 21 is preferably reflected to a beam dump (similar to beam dump 28) during the periods of time when it is not transmitted through apertures 24 of chopping wheel 23. This prevents stray and unwanted light from entering the remainder of the system.

Where alternative laser power detectors capable of continuous monitoring are used, then beam interruption means such as chopping wheel 23 and scanning mirror 123 will not be necessary.

Laser power detector 20 is preferably capable of responding very quickly to variations in the power of beam 16 and the resulting power of detector beam 21. A preferred laser power detector 20 is a pyroelectric type detector. An example of an acceptable pyroelectric detector is the Series 350 lead-zirconate-titanate detector manufactured by Barnes Engineering. Laser power detector 20 monitors the power during the time that it is exposed to detector beam 21 either through the apertures 24 of chopper wheel 23 or by means of scanning mirror 123. The chopper wheel or scanning mirror are necessary because such pyroelectric detectors are not capable of continuously measuring the laser power output. The chopper wheel 23 is advantageously synchronized with the operation of the overall system so that beam 21 is allowed to pass through chopper wheel aperture 24 at times appropriate for control of the primary laser beam power. Preferably a number of power readings are taken during the period of time during which the luminescent phosphor sample 40 is being heated. If the sample exposure time is 100 milliseconds, then chopping wheel 23 could be turned at a rate of approximately 100 revolutions per second thus providing approximately ten reading during exposure, or some integer division thereof if more than one aperture 24 is provided.

In addition to the pyroelectric detector and chopping wheel configuration shown in FIG. 1, it is also possible to use alternative laser power detectors which are capable of continuously monitoring laser beam power. One example of an alternative detector which is capable of continuous monitoring is the photoconductive mercury-cadmium-telluride detectors that are known in the art. These detectors are more costly but do provide the benefits of continuous monitoring. In such a case the beam interruption means 23 or 123 can be eliminated. Other components relating to electronic control of the system can also be eliminated in such an alternative embodiment.

Laser beam splitter 18 is designed and oriented so that the bulk of laser beam 16 passes directly therethrough. The continuing laser beam 16 is directed to a shutter means 26 for controlling exposure of the thermoluminescent phosphor sample 40 to the laser beam. Shutter means 26 can be selected from a variety of standard shutters available for high-powered lasers. Shutter 26 is preferably electrically actuated and controlled by an electrical control signal coming from the central control circuitry 75.

Shutter means 26 is preferably oriented at an oblique angle so that the reflected laser beam 16a (in phantom) is directed into a beam dump 28. Beam dump 28 is designed to stop the laser beam and to dissipate the energy of the laser beam. Beam dump 28 can be of a variety of different types, with a heat resistant ceramic having provision for heat dissipation being the preferred type.

Opening shutter means 26 allows laser beam 16 to continue therethrough and the beam can advantageously be redirected by reflecting it off a second reflective means such as infrared mirror 30. Laser beam 16 is then preferably fed into a beam equalizing means 31 where nonuniform laser sources are used.

Beam equalizing means 31 can include a lens means 32 which preferably is a convex, hemispherical or other infrared lens which disperses the parallel laser light into a dispersed beam 35 which is directed into an optical channel means 33. Optical channel means 33 has an optical channel 34 extending therethrough. Optical channel 34 is an elongated passageway or channel for reflecting, aligning, and equalizing the dispersed laser beam 35 as it passes therethrough. Optical channel 34 can have a square, rectangular, round or other cross-sectional shape. The inner walls of optical channel 34 are preferable highly polished and coated with a reflective substance, such as gold, to provide almost complete reflection of the dispersed laser beam 35. Dispersed laser beam 35 is emitted from optical channel means 33 as an equalized laser beam 36 and preferably beamed directly onto the luminescent phosphor sample 40 being read.

FIG. 7 shows an alternative beam equalizing means 150. Beam equalizing means 150 reflects and disperses laser beam 16 from a convex reflector 151 and into an optical channel 152. Optical channel 152 is highly reflective and can be similar to optical channel 33. The dispersed laser beam 153 is beamed onto the concave surface of a parabolic or other focusing reflector 154. The dispersed beam 153 is focused by parabolic reflector 154 onto an appropriate phosphor sample 155. The relative position of sample 155 with respect to reflector 154 is preferably adjustable so that the degree of focusing can be adjusted. The beam equalizing means of FIG. 7 provides a nearly uniform power and intensity profile across the beam at the point of impingement upon sample 155.

FIG. 8 shows a further alternative beam equalizing means 160. Incoming laser beam 16 is beamed through a convex lens 161 to disperse the beam into an optical channel means 162. The resulting dispersed laser beam 163 is gathered by a focusing lens 164 and focused to a point near phosphor sample 165. The relative position of sample 165 is advantageously adjustable so that the size and intensity of the impinging beam can be adjusted as needed.

FIG. 9 shows a still further alternative beam equalizing means. Incoming laser beam 16 is focused through a convex lens 219 onto a solid infrared transmissive fiber optic light guide 220. Internal reflections within the optic fiber 220 produce an equalized beam similar to optical channel 34. FIG. 9 also shows a thermoluminescent phosphor sample 221 positioned at the end of fiber 220 opposite from lens 219. The thermoluminescent emission from sample 221 can be transmitted through a light guide similar to that shown in FIG. 1 at numeral 47 and then detected by a detector similar to detector 45. This alternative beam equalizing means has the advantage of allowing the laser beam to be directed to remote locations to perform readings in place at the remote measurement location.

It is desirable that the thermoluminescent phosphors used in this invention be supplied in a form which does not interposition a substrate material between the equalized laser beam 36 and the thermoluminescent phosphor being heated. Elimination of the interpositioned substrate allows for increased heating rates of the thermoluminescent material without slowing the heating process and without the troublesome incandescent emissions which can occur when substrate materials are heated very rapidly. Alternatively, laser beam 36 can be directed through a transparent substrate in order to impinge upon the thermoluminescent phosphor. It is also possible to directly heat the substrate and indirectly heat the phosphor by conduction therethrough.

Luminescent phosphor sample 40 is preferably held in position for beaming equalized laser beam 36 thereon using a phosphor holding or positioning means (not shown). The phosphor holding or positioning means can be of any type suitable surface or bracket serving to hold the specific dosimeter configuration or other phosphor sample 40 in positions to receive equalized beam 36.

It is well known that thermoluminescent materials heated to thermoluminescent threshold temperatures will produce luminescent emissions which are usually in the visible light range with the specific wavelength(s) of light produced being dependent upon the particular phosphor chosen. Thermoluminescent threshold temperatures usually range between 100° C. -500° C. depending upon the particular phosphor. Thermoluminescent phosphors also typically display releases of stored energy at more than one temperature threshold. Lower temperature stimulation can cause a characteristic release at one temperature without substantially affecting other trapped electrons from being released at a characteristically higher temperature threshold.

Heating of phosphor sample 40 by beam 36 to the appropriate threshold temperatures causes luminescent emissions to occur. The luminescent emissions can be measured by a thermoluminescent emission measuring means such as photodetector 45. The thermoluminescent emission measuring means is preferably an amplifying device such as a photomultiplier tube well known in the art. Such amplifying photomuliplier tubes require a high voltage power supply 48. Other alternative means for measuring the intensity of emissions from luminescent phosphor 40 may be possible either with current or future technology.

Photodetector 45 can receive the luminescent emission directly or using a light guide 47 which is helpful in gathering and transmitting the thermoluminescent emission from phosphor 40 to the thermoluminescent emission measuring means 45. An infrared filter means 46 is preferably included somewhere between phosphor sample 40 and the photodetector 45. Filter means 46 filters any infrared light caused by any minute incandescence of sample 40 or any scattered infrared light from the laser beam or other sources.

The intensity or other relevant output signal from thermoluminescent emission measuring means 45 is sent to a luminescent emission signal processing and memory unit 52. Appropriate signal processing and memory units are well known in the art and can provide amplifications, digitalization, visual display, computer analysis, graphical printouts, and memory storage capability. It is highly desirable that the signal be amplified and recorded so that glow curve configurations can be carefully examined to determine the amount of ionizing radiation which struck the thermoluminescent phosphor being read. It is also possible in signal processing unit 52 to provide computerized integration or other empirical analysis to calculate the amount of ionizing radiation to which the thermoluminescent phosphor sample 40 was subjected. One embodiment of the invention performs further analysis to compare the amount of ionizing radiation to a threshold value and provide a simple output in the form of acceptable versus nonacceptable.

The apparatus of this invention is capable of reading thermoluminescent samples using heating times which are greatly reduced as compared to the prior art. It has been found that heating times in the range of 5 to 500 milliseconds are sufficient to heat and read the thermoluminescent phosphors. This must be compared with prior art techniques which at best claim reading times down to 500 milliseconds. This reduction in the amount of time necessary to heat the thermoluminescent phosphors can be translated into greatly reduced times and increased throughput for machinery constructed according to this invention designed for automated processing of dosimeters.

The greatly reduced heating times are made possible in part by equalizing the laser beam intensity profile so that a nearly uniform beam strikes the thermoluminescent material being heated. This allows the phosphors to be uniformly and rapidly heated at a maximum rate without causing incandescence of the substrate or phosphor due to localized overheating. Another advantage of the uniform beam profile is that it allows a well defined portion of the thermoluminescent material to be read and read with accuracy without stimulating peripheral portions at reduced power which causes unwanted emissions to be read. Thus, it becomes possible to read a plurality of points on a single very small sample of thermoluminescent foil or other dosimeter configurations. Reading discrete dots on the sample is limited only by conductive heating effects which may cause minute thermoluminescent emissions to occur about the boundary of the phosphor being heated directly by the equalized laser beam 36.

This invention allows for much greater power stability in the laser beam used to stimulate phosphor 40. Stable power control allows constant or appropriately profiled time varying laser power to be used. Stable beam power with time is accomplished using an electronic closed loop feedback control. A variety of systems are possible with alterations and alternatives being necessary depending upon the specific equipment and configuration being used, In general the laser power control system of the first embodiment of this invention includes laser power detector 20, control circuitry for taking the power detector output signal and providing a modulated signal for controlling laser power supply 15, and a laser power supply 15 which is capable of varying its power output in response to the modulated control signal.

Figure 2:
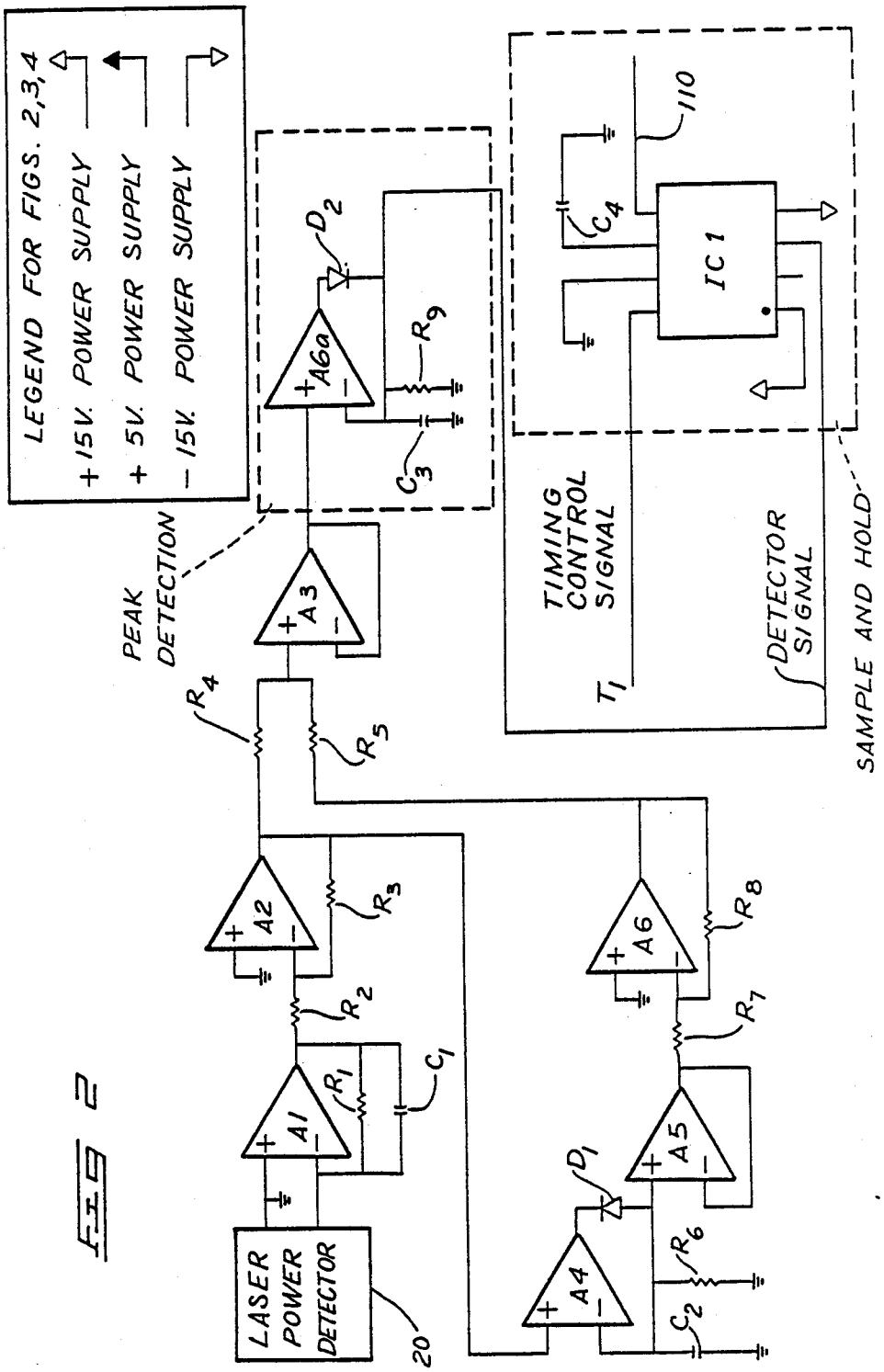
FIG. 2 is a schematic representation of electronic circuitry which can be used to construct the laser power detection and laser power signal enhancer portions shown in FIG. 1.

Laser power detector 20 provides a laser power signal which is sent to a laser power signal enhancer 62. FIG. 2 shows in greater detail one preferred form of laser power signal enhancer 62. The signal from the preferred lead-zirconate-titanate pyroelectric laser power detector 20 produces a current varying signal which is connected to a first amplifier A1 as shown in FIG. 2. A first resistor R1 and first capacitor C1 having approximate values of 100 kilohms and 470 picofarads are connected in parallel with amplifier A1. Values of various electronic components are shown in Table I near the end of the Detailed Description. The output from amplifier A1 is passed through resistor R2 and to the negative input of a second amplifier A2. The positive inputs of amplifier A1 and A2 are set to zero volts by grounding. A third resistor R3 is connected in parallel with amplifier A2. Amplifier A1 and resistor R1 convert the current signal of detector 20 into a voltage varying equivalent. The current is converted to a voltage by a conversion factor that is equal to R1. Amplifier A2 amplifies the output of A1 to provide a signal in the range of 1-10 volts. Capacitor C1 limits the frequency response to A1 preventing response to high frequency detector signals such as the 100 KHz modulation frequency discussed below or radiated high frequency noise.

The output of amplifier A2 is processed by amplifiers A3, A4, A5, and A6, resistors R4-R8, diode D1 and capacitor C2 to produce an output signal from amplifier A3 which is positive and referenced to zero. The resulting enhanced laser power signal is subsequently used in the modulation control circuit 70. A peak detection circuit formed by amplifier A6a, diode D2, capacitor C3 and resistor R9 can also advantageously be included to further process the output from laser power detector 20 so that peak values can be held and be more easily identified. Amplifiers A1-A6a can advantageously be type LF 356, LF353 or LF347 manufactured by National Semiconductor.

The output from amplifier A6a is advantageously connected to a sample and hold circuit which includes an integrated circuit IC1 which preferably is a type LF 398. Integrated circuit IC1 is connected in the manner indicated with pin 1 being identified by the dot. Other integrated circuits are also referenced to pin 1 using the dot.

Figure 3:
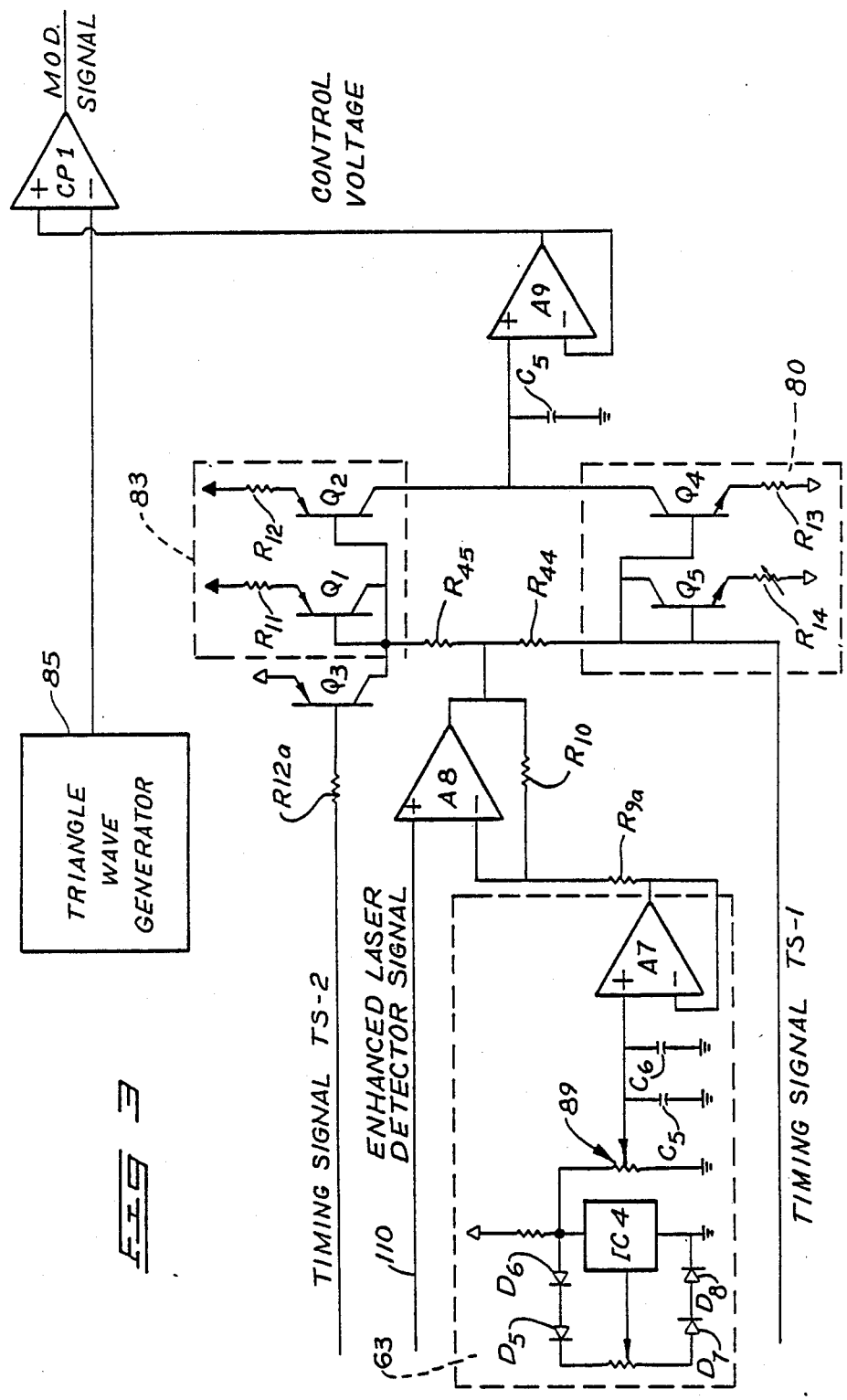
FIG. 3 is a schematic representation of electronic circuitry which can be used to construct the modulation control circuit and power reference signal generator portions shown in FIG. 1.

Output 110 from integrated circuit IC1 is connected to the modulation control circuit 70 shown in greater detail in FIG. 3. Modulation control circuit 70 is designed to control the power of laser beam 16 providing an output or modulation signal which is used to control laser power supply 15. The modulation control circuit will necessarily be governed in its specific design by the type of laser power supply used and many alternative modulation circuits are theoretically possible.

With the preferred embodiment radio frequency laser power supply, it is advantageous to modulate the power of laser beam 16 by regulating the length of time during which power is supplied to the laser. This intermittent control of voltage amplitude is preferably done at a high frequency relative to the exposure time of the phosphor samples and any beam interruption means frequency which is used. Frequencies for the modulation of the laser power supply of between 10 kilohertz to 1 megahertz have been found useful when using a 44 megahertz laser power supply. A 100 kilohertz frequency is preferred. The radio frequency power from the radio frequency power supply is accordingly turned off and on at a rate of 100 kilohertz with the length of time during which the power remains on during each cycle being changed to control total laser beam power.

FIG. 3 shows a preferred form of modulation control circuit 70. Modulation control circuit 70 receives an enhanced laser power signal from the output of signal enhancer 62 via connector 110. This output signal comes from IC1 and is connected to a difference amplifier A8. Difference amplifier A8 also receives input from a power reference signal generator 63. The gain of difference amplifier A8 is determined by the values of resistors R10 and R9a. Power reference signal generator 63 is preferably constructed to provide an adjustable 0-5 volt output voltage range. Diodes D5-D8 and integrated circuit IC4 provide a stable power supply in that voltage range. Integrated circuit IC4 is preferably a type LM 336-5 by National Semiconductor.

The output of amplifier A8 is connected through resistors R45 and R44 to a positive current source 83 and a negative current source 80, respectively. Current source 83 includes two resistors R11 and R12 connected to a positive 15 volt supply. Transistors Q1 and Q2 are connected to resistors R11 and R12 as indicated in FIG. 3. Current from positive current supply 83 is switched by transistor Q3 which is controlled by a timing signal TS-2, so that power adjustment occurs during timing period T2, immediately after a laser power measurement has been made (see FIG. 6). Negative current source 80 is similarly controlled by a parallel timing signal TS-1. Timing signals TS-1 and TS-2 originate in the central control 75.

Current source 80 includes resistor R13 and a variable resistor R14 connected to a −15 volt supply. Transistors Q4 and Q5 control current supply. Timing signal TS-1 from central control 75 permits current to flow only during timing pulse T2.

The collectors of transistors Q2 and Q4 are the outputs of current sources 83 and 80, respectively. Both outputs are connected to capacitor C5 which is also connected to the positive (+) input of amplifier A9. The output of amplifier A9 is fed back to the negative (−) input thereof, so that the amplifier gain is equal to 1.

Current source 80 discharges capacitor C5 decreasing the voltage on capacitor C5 when the measured power represented by enhanced laser detector signal 110 is higher than the desired power level determined by the power reference signal from power reference generator 63. Current source 83 charges capacitor C5, increasing the voltage on capacitor C5 when the measured power is lower than the power reference signal. The voltage applied to capacitor C5 is buffered through amplifier A9 to provide a control level or control voltage.

The control voltage from amplifier A9 is connected to the positive input of a comparator CP1. The negative input of comparator CP1 is connected to a triangle or other periodically increasing and decreasing wave generator having an output which is less than −15 volts and operated at a frequency which determines the modulation frequency, preferably at 100 kilohertz.

Figure 5A:
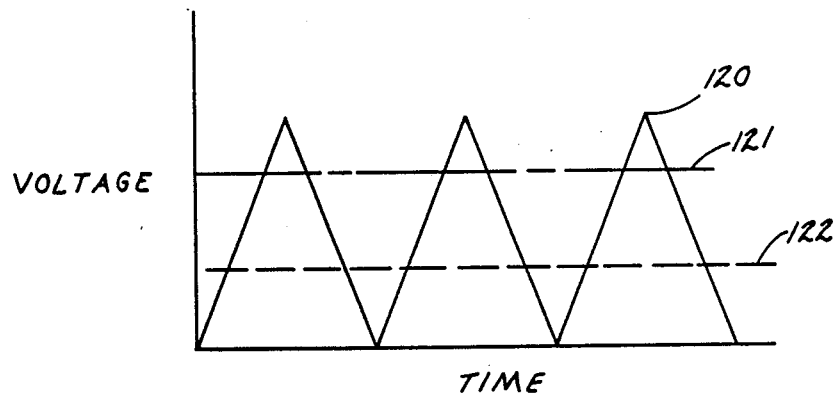
FIG. 5A is a graph showing a triangle wave and two laser control level signals.
Figure 5B:
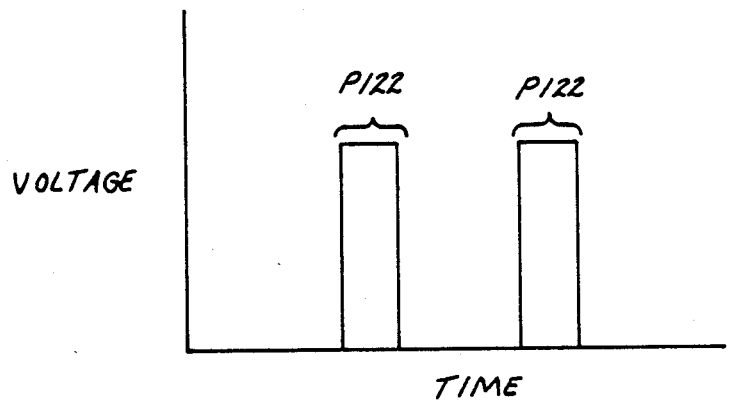
FIGS. 5B and 5C are graphs showing two different laser modulation signals used to modulate the laser power supply.
Figure 5C:
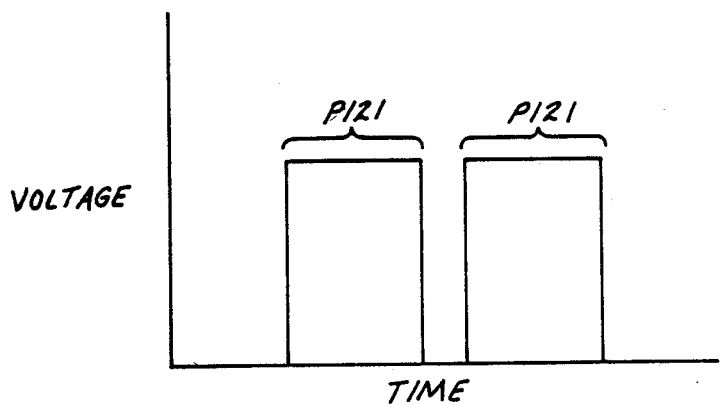

Comparator CP1 provides an output which is a modulation signal used to modulate the radio frequency laser power supply 15. FIG. 5A shows a line 120 which represents the output voltage of triangle wave generator 85. Comparator CP1 compares the output voltage of generator 85 to the power control voltage from amplifier A9. If the control voltage is greater than the triangle wave, then the output is on. FIG. 5B represents the output of comparator CP1 when the control voltage is at voltage level 122. The modulation signal has an associated on period P122. If this amount of laser power is insufficient as determined by laser power reference signal generator 63, then difference amplifier A8 causes current source 83 to increase the control voltage supplied to comparator CP1. N increase in control voltage is represented by line 121 in FIG. 5A. At control voltage level 121 there is an associated modulation signal having an on period P121 which is longer than period P122. Such increased period increases the amount of time laser power supply 15 is on thus increasing the power in laser beam 16 and adjusting the power of laser beam 15 until the power is equal to the predetermined set point established by power signal reference generator 63. Downward adjustment of beam 16 power is accomplished in a similar but opposite manner from the increase just described.

Figure 4:
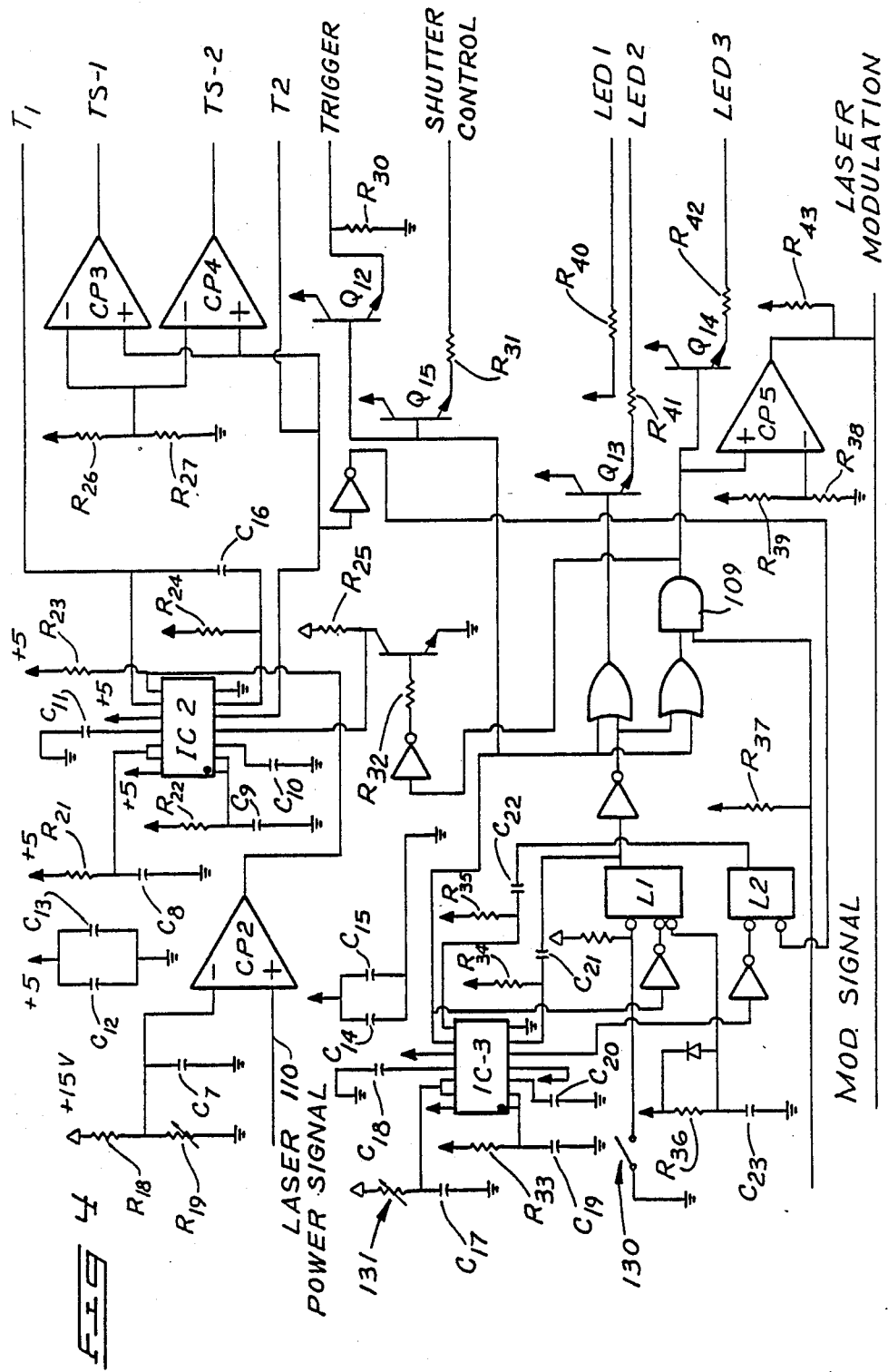
FIG. 4 is a schematic representation of electronic circuitry which can be used to construct the central control and operator control portions shown in FIG. 1.

The thermoluminescent phosphor reading apparatus of the first embodiment of this invention also includes a central control 75. Central control 75 can be any one of many different control circuits which perform the necessary and any optional functions desired. A preferred circuit for central control 75 is shown in FIG. 4. The central control circuit of FIG. 4 includes a comparator CP2 which is provided with an adjustable reference voltage and capacitance at the negative input. The enhanced laser power detector signal is connected to the positive input terminal of comparator CP2. The output of comparator CP2 is inputted into a first integrated timing circuit IC2 which is advantageously a National Semiconductor type LM556 dual timing unit. Integrated timing circuit IC2 creates timing signals T1 and T2. A number of resistors and capacitors are connected to IC2 to provide the desired timing periods. Additional capacitance is provided to the circuit by capacitors C12-C15. The value of preferred components are given in TABLE I.

Timing signal T is initiated by the onset of the rise in the laser power detector signal and its effect on comparator CP2. This is illustrated in FIG. 6. Timing signal T1 is sustained until the laser power detector signal decreases. Timing signal T2 is initiated upon termination of timing signal T1. Timing signals TS-1 and TS-2 are generated from and based upon timing signal T2 using comparators CP3 and CP4. The vertical differences between signals T2, TS-1 and TS-2 are the different voltages thereof.

The central control also includes a second timing integrated circuit IC3 which also is a dual timer type LM 556. Integrated timing circuit IC3 is used to time a startup sequence and the period of exposure of phosphor sample 40.

The read or exposure cycle is initiated by closing start switch 130 which sets latch L1 and starts second integrated timing circuit IC3 through a startup procedure which turns on laser 10 and adjusts the laser power to the desired level. After this startup is completed then a second cycle is started which determines the period of exposure of phosphor 40 to the laser beam. The period is adjustable using an exposure time control, which is advantageously variable resistor 131. The second cycle also opens shutter means 26 using the output from transistor Q15.

AND gate 109 generates a laser on signal which acts through comparator CP5 so that laser modulation signal from modulation control circuit 70 is grounded out unless a read cycle has been started. Indicator lights LED 1, LED 2, and LED 3 provide indication of power on, read cycle activated, and laser on, respectively. Latch L2 is used to prevent the shutter from operating during the timing signals T1 and/or T2 so that spurious electromagnetic noise does not affect the laser power detector signal.

It will be apparent to a person of ordinary skill in the art that other alternative control circuits 75 can be used to operate apparatus according to this invention.

Apparatuses according to the first embodiment of this invention are operated by first supplying electrical power to the system as a whole or the various components if separate power supplies are used. A previously exposed thermoluminescent phosphor is positioned in a phosphor positioning means (not shown) adjacent the optical equalizer means 31 for exposure to the equalized laser beam 36. The operator closes the start switch 130 and the central control 75, modulation control 70 and remaining circuitry is initiated and the power of laser beam 16 is adjusted automatically at a set point adjustable by power level control 89. Reading of the phosphor then automatically occurs, controlled by the control circuitry. The equalized laser beam strikes the phosphor sample 40 and heats it to the threshold temperature in the range of 100° C. –500° C. The phosphor then produces a thermoluminescent emission which is advantageously collected by light guide 47 and converted by photodetector 45 into an electrical signal measuring intensity. The resulting intensity versus time information is advantageously received, recorded, printed and analyzed by a suitable luminescent emission signal processing and memory unit 52 well known in the art of scientific data analysis.

This invention also includes methods for rapidly reading thermoluminescent phosphors to accurately determine the amount of ionizing radiation to which the phosphors have been exposed. Preferred methods first involve emitting a laser beam from a source of appropriate laser light. The laser beam is advantageously an infrared beam emitting from a carbon dioxide laser such as described above as laser beam source means 10. The methods also involve measuring the power contained in the emitted laser beam and controlling the power level of the laser beam to provide a desired laser beam power level with time. It is preferable to control the laser beam power within a variance range equal to approximately 1% or less of the total power contained in the laser beam.

Methods of this invention also preferably include equalizing the power profile of the laser beam with an optical equalizer such as 31 to produce a nearly uniform power density across the full cross section of the laser beam used to stimulate the thermoluminescent phosphor sample being read.

Methods of this invention further involve controlling the amount of time the thermoluminescent phosphor sample is exposed to the laser beam and the power of the beam so that rapid uniform heating to approximately 100° C.–500° C. is obtained. This is necessary in order to prevent overheating of the thermoluminescent phosphors so that erroneous readings and damage do not occur. Control of exposure time and power of the thermoluminescent phosphors is also advantageous in that it allows different phosphor samples or different areas of phosphors to be exposed for reading at different times so that discrete portions or samples of the thermoluminescent phosphors can be read independently. Control of exposure time can be accomplished using shutter means 26 described above and exposure time control 131.

Methods of this invention also advantageously include the step of measuring the luminescent emission occurring as a result of exposure of the thermoluminescent phosphor to the laser beam. This is accomplished using the thermoluminescent emission measuring means. The resulting measurements of thermoluminescent emission intensity, time interval and peak height can be theoretically analyzed and checked by calibrated specimens to provide standard values or measurements which are accurate as a measure of total radiation exposure.

A second apparatus according to this invention is shown in FIG. 10. The apparatus of FIG. 10 is similar to that of FIG. 1, and like elements are identified by like numerals therein. The following description will primarily address the elements of the apparatus of FIG. 10 that differ from the apparatus of FIG. 1.

The embodiment of FIG. 10 allows automatic time profiling of laser beam power levels. Time profiling of laser beam power can occur both within and between exposure periods for thermoluminescent phosphor sample 40. Variations of laser power as a function of time help to minimize incandescence which may otherwise occur when laser heating is performed over relatively short periods of time with correspondingly high rates of heat input. Time profiling of laser power may also be significant with regard to other operational and performance parameters.

Laser 10 emits laser beam 16 which is appropriately filtered and directed. A beam splitter 18 is advantageously used to divide the beam into a detector laser beam 21 and a continuing beam 16. Shutter 26 controls exposure of luminescent phosphor sample 40 to laser beam 16. FIG. 10 also shows use of the preferred optical equalizing means 31. Photodetector 45 is also included to detect and measure thermoluminescent emissions which come from sample 40.

The apparatus of FIG. 10 uses a scanning mirror 123 to direct the detector laser beam 21 to a suitable laser power detector 20 as described hereinabove. Laser power detector 20 is connected to a laser power signal enhancer 62. A preferred form of laser power signal enhancer is shown in FIG. 11.

Figure 11:
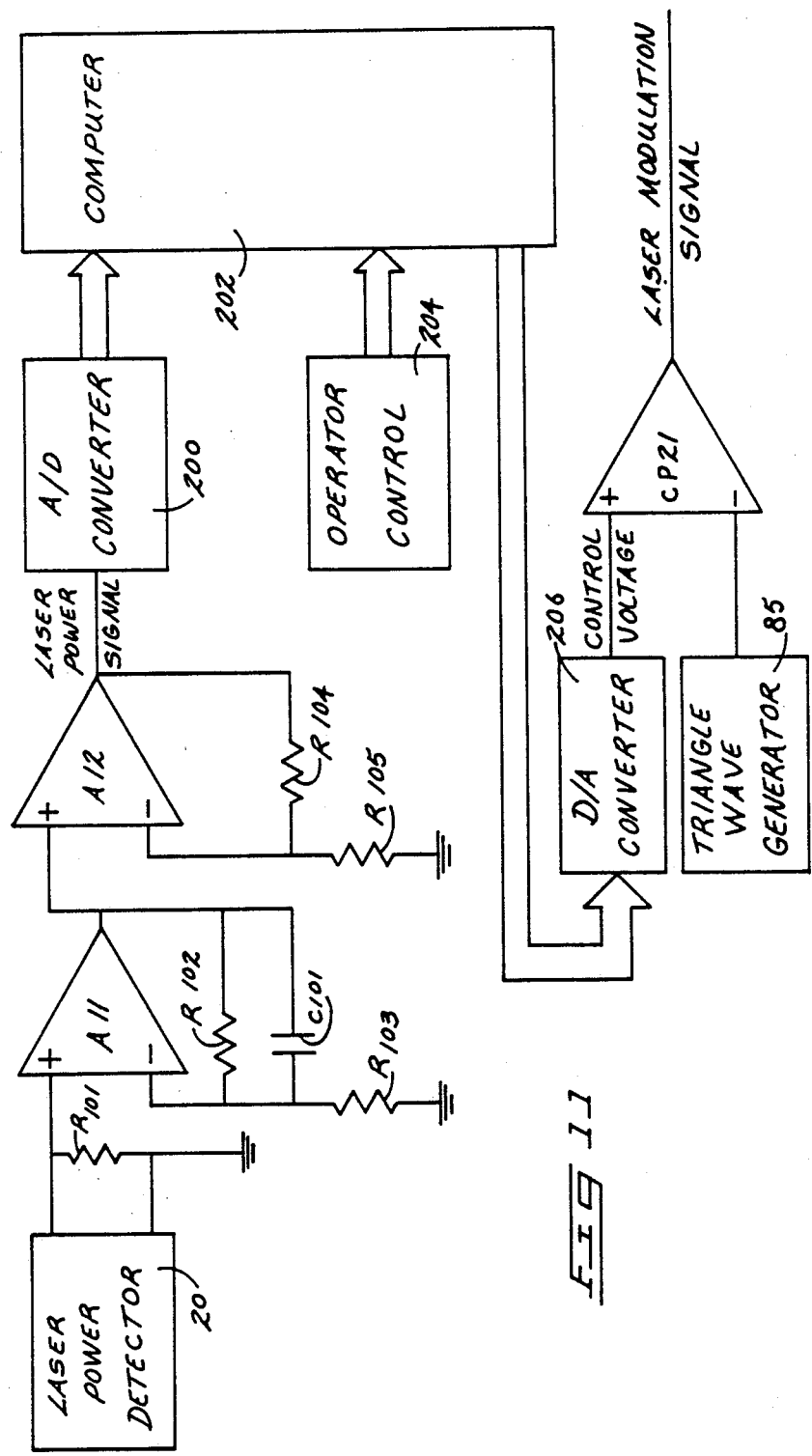
FIG. 11 is a schematic representation of electronic circuitry which can be used to construct the laser power detection, laser power signal enhancer, power reference, modulation control and timing, and operator control portions shown in FIG. 10.

FIG. 11 shows that laser power detector 20 is advantageously connected with a resistor R101 across the detector output terminals with one terminal advantageously connected to ground. The output signal from laser power detector 20 is connected to the plus input of operational amplifier A11. The signal from a preferred lead-zirconate-titanate pyroelectric laser power detector 20 produces a charge displacement proportional to the energy received upon exposure to the detector laser beam 21. The charge displacement causes a voltage signal to be produced which is input to the plus terminal of amplifier A11. The output from A11 is connected through parallel resistor R102 and capacitor C101 to the negative input terminal of amplifier A11. A resistor R103 is also connected between the negative input terminal of amplifier A11 and ground. Resistor R101 causes the input voltage signal to decay rapidly so that closely timed laser power measurements may be used to adjust the rate of power output at a rapid frequency. Resistors R102 and R103 determine the gain of amplifier of A11. Capacitor C101 limits the frequency response of amplifier A11 to prevent response to high frequency signals caused by the 100 kilohertz or other appropriate modulation frequency and other high frequency noise.

The output from amplifier A11 is input into the plus terminal of a further amplifier A12. The gain of amplifier A12 is determined by feedback control through resistor 104 connected to the negative terminal of A12, and by the value of resistor R105 which is connected to ground.

The output from amplifier A12 is the enhanced laser power signal. The enhanced laser power signal is input to an analog-to-digital converter 200. Analog-to-digital converter 200 produces a binary or other digital output signal representative of the value of the enhanced laser power signal. The output from A/D converter 200 is input to computer 202.

Computer 202 is preferably a general purpose computer adapted to receive the output from A/D converter 200 into one of its data input ports. Computer 202 is also adapted to receive operator control input from a keyboard or other operator control 204. Computer 202 can alternatively be a microprocessor provided with memory and support circuitry.

Computer 202 is properly programmed to provide a predetermined desired laser power value in digital form. Computer 202 compares the measured values of laser power from A/D converter 200 against the desired power level to produce a power difference which is communicated through a digital-to-analog converter 206. The output from D/A converter 206 is input to a plus terminal of comparator CP21. Comparator CP21 compares the control voltage from D/A converter 206 to a triangular or other appropriate time varying wave form generated by triangle wave generator 85 as described hereinabove. The output from comparator CP21 is the laser modulation signal which is communicated to laser power supply 15 in order to modulate the power output of laser 10 substantially as described hereinabove.

Computer 202 preferably is programmed to allow easy operator input of the desired power level, exposure time, power versus time profiling and any other pertinent operational parameters. Other alternative means for determining the desired power level exposure time and time profile may also be used. Computer 202 can also be connected directly to luminescent emission signal processing and memory unit 52 in order to transmit data thereto, or alternatively, to receive, store, analyze and display data originating from photodetector 45.

Computer 202 is advantageously programmed to provide automatic control of the power level of laser beam 16 as a function of time. Control of laser beam 16 can occur either within an exposure period of phosphor sample 40 or in between such exposure periods.

Figure 12:
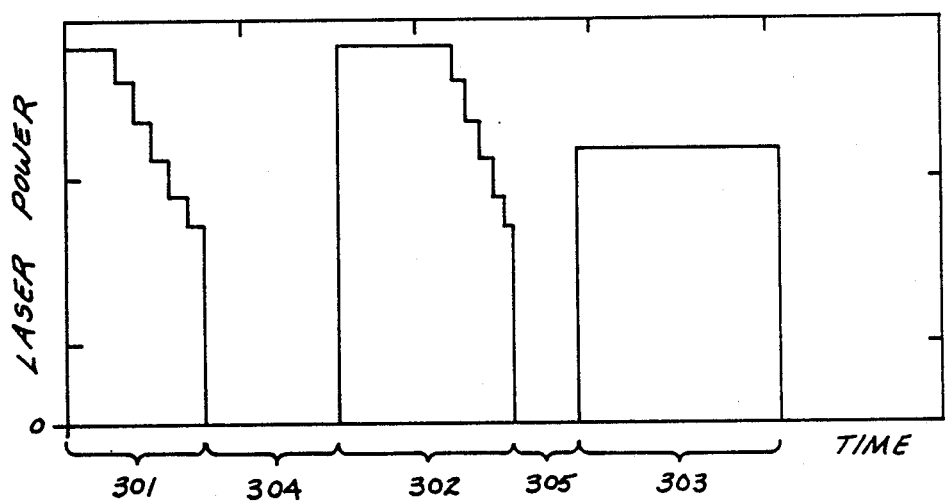
FIG. 12 is a graph showing controlled laser power as a function of time including pre-anneal, read, and post-anneal exposure periods.
Figure 13:
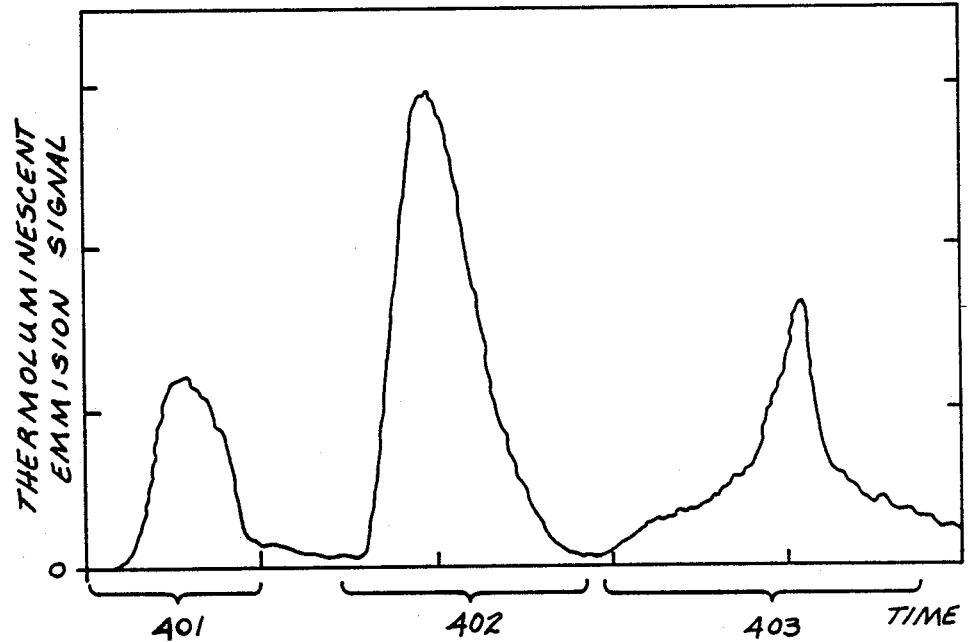
FIG. 13 is a graph showing phosphor luminescent emission resulting from the pre-anneal, read, and post-anneal exposure cycles of FIG. 12.

FIG. 12 shows a graph of laser power versus time using the apparatus of FIG. 10. FIG. 13 shows a resultant thermoluminescent output signal produced from a sample including $CaSO_4:Dy$ having a surface density of 4.5 milligrams per square centimeter. Exposure of the sample was to beta radiation.

FIG. 12 shows that the sample was read by exposing it to three different periods of laser heating. The first period is termed the pre-anneal and is represented by the time period 301. A second or read exposure period marked 302 is also shown in FIG. 12. The final or post-anneal exposure period 303 is also shown in FIG. 12. FIG. 12 further shows that during the start of the pre-anneal and reading exposure periods that the laser power level is relatively high, in fact, approximately at a maximum. During such exposure periods the power is decreased in order to reduce the heating rates and minimize or prevent incandescence of the phosphor or substrate materials. A maximum laser power output of 25 watts is appropriate for the phosphor used.

The time period for adjustments of the laser power level in time profiled laser reading is advantageously in the range of 0.1 to 10 milliseconds. An adjustment interval of 2 milliseconds is currently the preferred interval. The time profiling adjustment interval is determined by computer 202 and suitable software or other appropriate means. The exposure frequency provided by any beam interruption means should also be adjusted so that adequate data is provided for accurate power adjustment at the desired frequency of power adjustment.

There are several reasons for the three stage exposure period shown in FIG. 12. The nature of thermoluminescent phosphors causes electrons to in many cases be stored at different energy levels. The relatively lower energy traps are typically easier to release or "detrap" and require less energy input. Such lower energy traps can accordingly be detrapped using relatively lower temperatures. In many cases, temperatures in the range of 100° C. to 200° C. are associated with detrapping of relatively low energy thermoluminescent peaks. These relatively lower temperature emissions or peaks are not an accurate representation of the total radiation received because of their greater susceptibility to decay with time. Accordingly, it is desirable to remove such radiation prior to reading the higher energy electrons. This is advantageously done in a pre-anneal laser heating step.

Pre-anneal exposure period 301 of FIG. 12 causes the luminescent phosphor sample 40 to be raised to a temperature above the minimal detrapping temperature for the lower energy thermoluminescent peaks. The pre-anneal temperature must not be excessive or else significant numbers of more stable, higher energy electrons already trapped will be released and accuracy will be lost. Fig. 13 shows a pre-anneal emission phase 401 which indicates the thermoluminescent energy output occurring due to detrapping of the relatively lower temperature thermoluminescent energy.

After the pre-anneal exposure it is desirable to provide a brief period of time during which the low energy detrapping can be completed and during which the power level of the laser beam 16 can be adjusted, usually increased. This intermediate period 304 is preferably accomplished with shutter means 26 closed, thereby preventing any further temperature increase in the thermoluminescent phosphor sample 40.

FIG. 12 also shows a read exposure period or cycle 302 during which the laser power is started at a relatively high or maximum level and then decreased near the end to minimize incandescence. FIG. 13 shows an associated thermoluminescent read cycle output signal during period 402 associated with the release of relatively stable thermoluminescent energy of the phosphor as the temperature of the phosphor increased.

After the read cycle it is desirable to provide a brief period of time 305 during which the thermoluminescent phosphors are no longer exposed to laser beam 16. The exact duration of inter-exposure periods 304 and 305 will depend upon the specifics of the operational and thermoluminescent phosphor systems being used.

It is also desirable to include a post-anneal exposure period 303 in order to further heat the thermoluminescent phosphor sample to a sufficiently high enough temperature so as to remove any residual trapped or stored energy prior to the next use of a reusable phosphor sample. Another important reason for applying the post-anneal heating cycle is to restore the trap distribution in the lattice of the thermoluminescent phosphor material. This restores the original properties of the material, an important factor in re-use. The response of a thermoluminescent phosphor material is substantially dependent on its thermal history. That is, its response during re-use is influenced by the heat treatment received during the previous readout. If accurate readings are to take place during subsequent use, it is vital to restore the lattice trap distribution to its original state.

Heating of the phosphor sample due to post-anneal cycle 303 produces a combined luminescent and incandescent output represented by the output occurring approximately during period 403 of FIG. 13.

FIG. 14 shows an alternative laser power-time profile 501. Laser power is pre-programmed to a predetermined value of approximately 25 watts. At time 0 the shutter is opened. A preprogrammed laser power profile is used to control the desired laser power decreasing it from a relatively maximum value during the start of the pre-anneal cycle down to a relatively lower power level of approximately 10 watts, at which time the shutter 26 is closed, thereby completing the pre-anneal cycle. The timing of various power levels is indicated in FIG. 14.

An inter-exposure period 505 is provide between the pre-anneal cycle and the read cycle. During the interexposure period, it is possible to modulate the laser power level back to the desired maximum of 25 watts. Shutter 26 is thereafter opened and maintained at near the maximum value for a period of approximately 50 milliseconds. Thereafter, the pre-programmed laser power time profile decreases the power level down to a minimum of approximately 8 watts at the end of the read cycle.

It will be readily apparent to those skilled in the art that many alternative laser power time profiles are possible.

TABLE 1

| RESISTORS | | |
| --- | --- | --- |
| R1 | 100 | kilohms |
| R2 | 1 | kilohm |
| R3 | 200 | kilohms |
| R4 | 1 | kilohm |
| R5 | 1 | kilohm |
| R6 | 10 | kilohms |

TABLE 1-continued

| R7 | 100 | kilohms |
| --- | --- | --- |
| R8 | 100 | kilohms |
| R9 | 1 | megohm |
| R9a | 6.8 | kilohms |
| R10 | 680 | kilohms |
| R11 | 510 | ohms |
| R12 | 510 | ohms |
| R13a | 470 | kilohms |
| R13 | 510 | ohms |
| R14 | 0-1 | kilohm |
| R18 | 30 | kilohms |
| R19 | 0-10 | kilohms |
| R21 | 200 | kilohms |
| R22 | 300 | kilohms |
| R23 | 6.8 | kilohms |
| R24 | 30 | kilohms |
| R25 | 6.8 | kilohms |
| R26 | 20 | kilohms |
| R27 | 30 | kilohms |
| R30 | 100 | ohms |
| R31 | 270 | ohms |
| R32 | 200 | kilohms |
| R33 | 4.7 | megaohms |
| R34 | 30 | kilohms |
| R35 | 30 | kilohms |
| R36 | 100 | kilohms |
| R37 | 6.8 | kilohms |
| R38 | 20 | kilohms |
| R39 | 30 | kilohm |
| R40 | 510 | ohms |
| R41 | 270 | ohms |
| R42 | 270 | ohms |
| R43 | 3 | kilohms |
| R44 | 200 | kilohms |
| R45 | 200 | kilohms |
| CAPACITORS | | |
| C1 | 470 | picofarads |
| C2 | 1 | microfarad |
| C3 | 0.1 | microfarad |
| C4 | 6800 | picofarads |
| C5 | 0.1 | microfarad |
| C6 | 10 | microfarads |
| C7 | 0.1 | microfarad |
| C8 | 0.01 | microfarad |
| C9 | 0.01 | microfarad |
| C10 | 0.01 | microfarad |
| C11 | 0.01 | microfarad |
| C12 | 10 | microfarads |
| C13 | 0.1 | microfarad |
| C14 | 10 | microfarads |
| C15 | 0.1 | microfarad |
| C16 | 0.001 | microfarad |
| C17 | 18 | microfarads |
| C18 | 0.01 | microfarad |
| C19 | 0.01 | microfarad |
| C20 | 0.01 | microfarad |
| C21 | 0.001 | microfarad |
| C22 | 0.001 | microfarad |
| C23 | 0.001 | microfarad |
| C24 | 10 | microfarads |

TABLE II

| RESISTORS | | |
| --- | --- | --- |
| R101 | 100 | kilohms |
| R102 | 30 | kilohms |
| R103 | 1 | kilohms |
| R104 | 100 | kilohms |
| R105 | 2 | Kilohms |
| CAPACITORS | | |
| C101 | 470 | picofarads |

In compliance with the statute, the invention has been described in language more or less specific as to structural features. It is to be understood, however, that the invention is not limited to the specific features shown, since the means and construction herein disclosed comprise a preferred from of putting the invention into effect The invention is, therefore, claimed in any of its forms or modifications within the proper scope of the appended claims, appropriately interpreted in accordance with the doctrine of equivalents.

We claim:

1. A phosphor reading apparatus for reading the level of ionization existing in a phosphor as a result of exposure of the phosphor to ionizing radiation, comprising:
   laser beam source means for generating and emitting a laser beam; said laser beam source means being capable for modulation to control power of an emitted laser beam;
   laser beam power detection means for measuring the power of the laser beam at least once during an exposure period during which the laser beam is directed upon the phosphor;
   laser power control means for rapidly and adjustably modulating the power of the emitted laser beam to desired levels as a function of time; said laser power control means controlling the laser beam which is variable in power during an exposure period; and
   emission measuring means for measuring emission occurring from the phosphor as a result of directing the laser beam upon the phosphor.

2. The apparatus of claim 1 further comprising laser beam optical equalizing means for equalizing the cross-sectional intensity of the laser beam; the optical means being positioned to equalize the laser beam before the laser beam strikes the phosphor.

3. The apparatus of claim 1 wherein the laser power control means is preprogrammed to automatically provide at least one predetermined level of laser beam power.

4. The apparatus of claim 1 wherein the laser power control means is preprogrammed to automatically provide a predetermined level of laser beam power which varies as a function of time.

5. The apparatus of claim 1 wherein the laser power control means includes digital computer means and modulation circuit means connected to the digital computer means and connected to the laser beam source means for modulating the power of the laser beam under the control of the digital computer means.

6. The apparatus of claim 5 and further comprising a shutter means for controlling exposure of the phosphor to said laser beam; and wherein the shutter means is connected to said digital computer means to control opening of the shutter means in a manner coordinated with modulation of the power of the emitted laser beam.

7. The apparatus of claim 1 further comprising means for dividing the laser beam before the laser beam reaches the shutter means to produce a detector laser beam; and beam interruption means for occasionally passing the detector laser beam to the laser beam power detection means.

8. The apparatus of claim 7 wherein the beam interruption means includes a rotatable device having at least one aperture therein for periodically transmitting the detector laser beam therethrough.

9. The apparatus of claim 7 wherein the beam interruption means includes a scanning mirror for periodically directing the detector laser beam to the laser beam power detection means.

10. The apparatus of claim 1 wherein the emission measuring means includes a emission signal processing unit for displaying and storing information indicating the measured emission from the phosphor.

11. The apparatus of claim 1 further comprising phosphor positioning means for holding the phosphor in position to be exposed to the laser beam.

12. The apparatus of claim 1 wherein the laser power detection means is adapted to measure the power of the laser beam repeatedly during the exposure period.

13. A method for rapidly reading a phosphor to determine the amount of ionizing radiation to which the phosphor has been exposed, comprising:
    emitting a laser beam from a laser beam source means which is capable of modulation to control a power level of the emitted laser beam;
    measuring the power of the laser beam at least once during an exposure period during which the phosphor is exposed to the laser beam for heating;
    controlling the laser beam source means to obtain desired laser beam power variable as a function of time;
    controlling exposure of the phosphor to the laser beam so that the phosphor is exposed to the laser for desired amounts of time; and
    measuring emission occurring as a result of exposure of the phosphor to the laser beam.

14. The method of claim 13 further comprising the step of equalizing the laser beam with an optical equalizer means to produce an equalized laser beam having approximately uniform cross-sectional power density, the phosphor being exposed to the equalized laser beam.

15. The method of claim 13 further comprising the step of dividing the laser beam into at least an additional detector laser beam, and wherein the measuring step is performed upon said detector laser beam.

16. The method of claim 13 wherein the phosphor is exposed to the laser beam in a first pre-annealing step and subsequently in a second reading step.

17. The method of claim 16 wherein the phosphor is exposed to the laser beam after the reading step in a third post-annealing step.

18. The method of claim 13 wherein the phosphor is exposed to the laser beam in a reading step followed by a post-annealing step.

19. The method of claim 16 wherein the power of the laser beam is decreased during ending portions of the pre-annealing and reading steps.

20. The method of claim 13 wherein the power level of the laser beam is at an approximate cycle maximum level during start of an exposure period and is at a lower power level at an end of said exposure period.

21. The method of claim 13 wherein the phosphor is exposed during a plurality of exposure periods.

22. The method of claim 21 wherein the plurality of exposure periods occur within a period of approximately 1 second.

23. The method of claim 13 wherein the phosphor is heated for a predetermined period of time less than 500 milliseconds.

24. The method of claim 15 wherein the detector laser beam is intermittently passed to a laser power detector at a frequency rate of at least 1 Hz.

25. The method of claim 15 wherein the detector laser beam is continuously measured and controlled to maintain a desired time-varying power level.

26. The method of claim 13 wherein the step of controlling the laser beam source means is performed by a digital computer means.

27. The method of claim 13 wherein the step of controlling the laser beam source means is performed in a predetermined manner by means of a digital computer.

28. The method of claim 26 wherein the step of controlling exposure of the phosphor to the laser beam is performed by means of a shutter means positioned in the path of the laser beam; said shutter means being under the control of the digital computer.

29. The method of claim 13 further including storing information measured about said emission using a computer means.

30. A phosphor reading apparatus for reading the level of ionization existing in a phosphor as a result of exposure of the phosphor to ionizing radiation, comprising:
 laser beam source means for generating and emitting a laser beam; said laser beam source means being capable of modulation control power of the laser beam;
 laser beam power detection means for measuring the power of the laser beam at least once during an exposure period during which the laser beam is directed upon the phosphor;
 laser power control means for rapidly and adjustably modulating power output of the laser beam source means to achieve desired laser beam power; and
 emission measuring means for measuring emission occurring from the phosphor as a result of directing the laser beam upon the phosphor.

31. The apparatus of claim 30 further comprising a laser beam optical equalizing means for equalizing the cross-sectional intensity of the laser beam; the optical equalizing means being positioned to equalize the laser beam before the laser beam strikes the phosphor.

32. The apparatus of claim 31 wherein the laser beam power detection means comprises a fast pyroelectric laser detector and a beam interruption means for intermittently allowing at least a portion of the laser beam to strike upon the pyroelectric laser detector.

33. The apparatus of claim 31 wherein the laser beam power detection means comprises a fast photoconductive laser detector.

34. The apparatus of claim 31 wherein the laser beam optical equalizing means comprises a lens means for dispersing the laser beam into and through an adjacent optical channel having reflective channel walls.

35. The apparatus of claim 31 further comprising a focusing reflector means for focusing the laser beam onto the phosphor.

36. The apparatus of claim 31 further comprising a focusing lens means for focusing the laser beam onto the phosphor.

37. The apparatus of claim 31 wherein the optical equalizing means comprises an optic fiber light guide.

38. The apparatus of claim 30 wherein the laser power detection means is adapted to measure the power of the laser beam repeatedly during the exposure period.

39. A method for rapidly reading a phosphor to determine the amount of ionizing radiation to which the phosphor has been exposed, comprising:
 emitting a laser beam from a laser beam source means;
 measuring the power of the laser beam at least once during an exposure period during which the phosphor is exposed to the laser beam;
 controlling the laser beam source means to achieve desired laser beam power;
 controlling exposure of the phosphor to the laser beam so that the phosphor is exposed for a desired amount of time; and
 measuring any emission occurring as a result of exposure of the phosphor to the laser beam.

40. The method of claim 39 wherein the phosphor is heated for a predetermined period of time in the range between 0.1–500 milliseconds.

41. The method of claim 39 further comprising the step of dividing the laser beam into at least an additional detector laser beam, and wherein the measuring step is performed upon said detector laser beam.

42. The method of claim 41 wherein the detector laser beam is intermittently passed to a laser power detector at a frequency rate of at least 1 Hz.

43. The method of claim 41 wherein the detector laser beam is continuously measured.

44. The method of claim 41 further comprising polarizing the laser beam.

45. The method of claim 39 further comprising polarizing the laser beam.

46. The method of claim 39 further comprising equalizing the laser beam to produce an equalized laser beam having more uniform cross-sectional power density.

47. The method of claim 46 wherein said equalizing is at least partially accomplished by passing the laser beam through a transmissive fiber.

48. The method of claim 46 wherein said equalizing is at least partially accomplished by passing the laser beam through a reflective channel.

49. The method of claim 46 and further comprising focusing the equalized laser beam to produce a desired stimulating beam which impinges upon the phosphor.

50. A phosphor reading apparatus for reading the level of ionization existing in a phosphor as a result of exposure of the phosphor to ionizing radiation, comprising:
 laser beam source means for generating and emitting a radio frequency laser beam, said laser beam source means being capable of modulation to control power of an emitted laser beam;
 means for dividing said laser beam to produce a detector laser beam therefrom;
 laser beam power detection means for measuring the power of the detector laser beam repeatedly during an exposure period during which the laser beam is directed upon the phosphor;
 phosphor positioning means for holding the phosphor in position to be exposed to the laser beam;
 laser power control means for rapidly and adjustably modulating the power of the emitted laser beam to a desired level which varies over time during the exposure period;
 shutter means positioned to control exposure of the phosphor held by the phosphor positioning means without preventing receipt of the detector laser beam by the laser power detection means;
 laser beam optical equalizing means for equalizing the cross-sectional power density of the laser beam prior to impingement of the laser beam upon the phosphor; and
 emission measuring means for measuring emission occurring as a result of exposure of the phosphor to the laser beam.

51. A phosphor reading apparatus for reading the level of ionization existing in a phosphor as a result of exposure of the phosphor to ionizing radiation, comprising:
 laser beam source means for generating and emitting a laser beam; said laser beam source means being capable of modulation to control power of an emitted laser beam;

laser beam power detection means for measuring the power of the laser beam at least once during an exposure period during which the laser beam is directed upon the phosphor;

laser power control means for rapidly and adjustably modulating the power of the emitted laser beam as desired over time; and emission measuring means for measuring emission occurring as a result of exposure of the phosphor to the laser beam.

52. The apparatus of claim 51 further comprising laser beam optical equalizing means for equalizing the cross-sectional intensity of the laser beam; the optical equalizing means being positioned to equalize the laser beam before the laser beam strikes the phosphor.

53. The apparatus of claim 51 wherein the laser power control means is preprogrammed to automatically provide at least one predetermined level of laser beam power.

54. The apparatus of claim 51 wherein the laser power control means is preprogrammed to automatically provide a predetermined level of laser beam power which varies as a function of time during the exposure period.

55. The apparatus of claim 51 further comprising shutter means for controlling exposure of the phosphor to said laser beam.

56. The apparatus of claim 51 further comprising shutter means for controlling exposure of the phosphor to said laser beam, and wherein the shutter means controls exposure of the phosphor without preventing operation of the laser beam power detection means.

57. The apparatus of claim 51 further comprising shutter means for controlling exposure of the phosphor to said laser beam and means for dividing the laser beam before the laser beam reaches the shutter means to produce a detector laser beam.

58. The apparatus of claim 57 further comprising beam interruption means for occasionally passing the detector laser beam to the laser beam power detection means.

59. The apparatus of claim 57 wherein the beam interruption means includes a movable element which controllably blocks the laser beam.

60. The apparatus of claim 57 wherein the beam interruption means includes a scanning mirror.

61. The apparatus of claim 60 wherein the scanning mirror intermittently directs the detector laser beam to the laser beam power detector.

62. The apparatus of claim 51 further comprising phosphor positioning means for holding the phosphor in position to be exposed to the laser beam.

63. A phosphor reading apparatus for reading the level of ionization existing in a phosphor as a result of exposure of the phosphor to ionizing radiation, comprising:

at least one laser beam source for generating and emitting a laser beam;

at least one laser beam power detector for measuring the power of the laser beam to provide an indication of the power of the laser beam during an exposure period during which the laser beam is directed upon the phosphor;

at least one laser power control means for controlling power output of the at least one laser beam source to achieve desired laser beam power; and emission measuring means for measuring emission occurring from the phosphor as a result of directing the laser beam upon the phosphor.

64. The apparatus of claim 63 further comprising at least one laser beam optical equalizer for equalizing the cross-sectional intensity of the laser beam.

65. The apparatus of claim 64 wherein the at least one optical equalizer is positioned to equalize the laser beam before the laser beam strikes the phosphor.

66. The apparatus of claim 64 wherein the at least one laser beam optical equalizer comprises at least one lens for dispersing the laser beam into and through an adjacent optical channel.

67. The apparatus of claim 64 wherein the at least one optical equalizer comprises an optic fiber light guide.

68. The apparatus of claim 63 further comprising a focusing reflector means for focusing the laser beam onto the phosphor.

69. The apparatus of claim 63 further comprising a focusing lens means for focusing the laser beam onto the phosphor.

70. The apparatus of claim 63 further comprising at least one laser beam splitter for dividing the laser beam.

71. The apparatus of claim 70 wherein said at least one laser beam splitter produces at least one detector laser beam which is sensed by at least one laser beam power detector.

72. The apparatus of claim 63 further comprising at least one laser beam splitter for dividing the laser beam to produce at least one detector laser beam which is intermittently sensed by at least one laser beam power detector.

73. The apparatus of claim 63 further comprising at least one laser beam splitter for dividing the laser beam to produce at least one detector laser beam which is approximately continuously sensed by at least one laser beam power detector.

74. The apparatus of claim 63 further comprising:

at least one laser beam splitter for dividing the laser beam to produce at least one detector laser beam which is sensed by at least one laser beam power detector;

at least one detector beam interrupter for intermittently directing at least one detector laser beam to at least one laser beam power detector.

75. The apparatus of claim 74 wherein the at least one beam interrupter includes a rotatable device having at least one aperture therein for periodically transmitting the at least one detector laser beam therethrough.

76. The apparatus of claim 74 wherein the at least one beam interrupter includes a scanning mirror for periodically directing at least one detector laser beam to at least one laser beam power detector.

77. That apparatus of claim 63 further comprising at least one shutter to control exposure of the phosphor to the laser beam.

78. The apparatus of claim 63 further comprising at least one polarizer for polarizing the laser beam.

79. A phosphor stimulating apparatus for stimulating a phosphor to cause emission from the phosphor associated with exposure of the phosphor to ionizing radiation, comprising:

at least one laser beam source for generating and emitting a laser beam;

at least one laser beam power detector for measuring the power of the laser beam to provide an indication of the power of the laser beam during an exposure period during which the laser beam is directed upon the phosphor;

at least one laser power control for controlling power output of the at least one laser beam source to achieve desired laser beam power.

80. The apparatus of claim 79 further comprising at least one laser beam optical equalizer for equalizing the cross-sectional intensity of the laser beam.

81. The apparatus of claim 80 wherein the at least one optical equalizer is positioned to equalize the laser beam before the laser beam strikes the phosphor.

82. The apparatus of claim 80 wherein the at least one laser beam optical equalizer comprises at least one lens for dispersing the laser beam into and through an adjacent optical channel.

83. The apparatus of claim 80 wherein the at least one optical equalizer comprises an optic fiber light guide.

84. The apparatus of claim 79 further comprising a focusing reflector for focusing the laser beam onto the phosphor.

85. The apparatus of claim 79 further comprising a focusing lens for focusing the laser beam onto the phosphor.

86. The apparatus of claim 79 further comprising at least one laser beam splitter for dividing the laser beam.

87. The apparatus of claim 86 wherein said at least one laser beam splitter produces at least one detector laser beam which is sensed by the at least one laser beam power detector.

88. The apparatus of claim 79 further comprising at least one laser beam splitter for dividing the laser beam to produce at least one detector laser beam which is intermittently sensed by at least one laser beam power detector.

89. The apparatus of claim 79 further comprising at least one laser beam splitter for dividing the laser beam to produce at least one detector laser beam which is sensed in an approximately continuous manner by at least one laser beam power detector.

90. The apparatus of claim 79 further comprising:
at least one laser beam splitter for dividing the laser beam to produce at least one detector laser beam which is sensed by at least one laser beam power detector;
at least one detector beam interrupter for intermittently directing at least one detector laser beam to at least one laser beam power detector.

91. The apparatus of claim 90 wherein the at least one beam interrupter includes a rotatable device having at least one aperture therein for periodically transmitting the at least one detector laser beam therethrough.

92. The apparatus of claim 90 wherein the at least one beam interrupter includes a scanning mirror for periodically directing the at least one detector laser beam to the at least one laser beam power detector.

93. The apparatus of claim 79 further comprising at least one shutter to control exposure of the phosphor to the laser beam.

94. The apparatus of claim 79 further comprising at least one polarizer for polarizing the laser beam.

95. A method for stimulating a phosphor to cause emission from the phosphor to release stored energy caused by ionizing radiation to which the phosphor has been exposed, comprising:
emitting at least one laser beam from at least one laser beam source;
measuring the power of at least one laser beam at least once during an exposure period during which the phosphor is exposed to the at least one laser beam;
controlling the at least one laser beam source to achieve desired laser beam power;
controlling exposure of the phosphor to the at least one laser beam so that the phosphor is exposed in a desired manner.

96. The method of claim 95 wherein the phosphor is exposed for a predetermined period of time in the range between 0.1-500 milliseconds.

97. The method of claim 95 further comprising the step of dividing the at least one laser beam to produce at least one detector laser beam, and wherein the measuring step is performed upon at least one detector laser beam.

98. The method of claim 97 wherein the at least one detector laser beam is intermittently passed to a laser power detector at a frequency rate of at least 21 Hz.

99. The method of claim 97 wherein the at least one detector laser beam is continuously measured and controlled to provide desired laser beam power.

100. The method of claim 97 further comprising polarizing the at least one laser beam.

101. The method of claim 95 further comprising polarizing the at least one laser beam.

102. The method of claim 95 further comprising equalizing is a laser beam to produce an equalized laser beam having more uniform cross-sectional power density.

103. The method of claim 102 wherein said equalizing is at least partially accomplished by passing the laser beam through an optically transmissive fiber.

104. The method of claim 102 wherein said equalizing is at least partially accomplished by passing the laser beam through a reflective channel.

105. The method of claim 102 and further comprising focusing the equalized laser beam to produce a desired stimulating beam which impinges upon the phosphor.

* * * * *